US009441983B2

(12) United States Patent
Wong et al.

(10) Patent No.: US 9,441,983 B2
(45) Date of Patent: Sep. 13, 2016

(54) NAVIGATION SYSTEM WITH CONTENT CURATION MECHANISM AND METHOD OF OPERATION THEREOF

(71) Applicant: TeleNav, Inc., Sunnyvale, CA (US)

(72) Inventors: Jaffe Wong, San Jose, CA (US); Aliasgar Mumtaz Husain, Milpitas, CA (US); Sunny Dinmohamed Panjwani, Santa Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 577 days.

(21) Appl. No.: 13/785,735

(22) Filed: Mar. 5, 2013

(65) Prior Publication Data

US 2014/0258310 A1 Sep. 11, 2014

(51) Int. Cl.
*G06F 17/30* (2006.01)
*G01C 21/36* (2006.01)
*G01C 21/20* (2006.01)

(52) U.S. Cl.
CPC ........... *G01C 21/3679* (2013.01); *G01C 21/20* (2013.01)

(58) Field of Classification Search
CPC ..................... G01C 21/3679; G06F 17/30598
USPC .......................................................... 707/737
See application file for complete search history.

(56) References Cited

U.S. PATENT DOCUMENTS

| 7,353,109 | B2 | 4/2008 | Han | |
|---|---|---|---|---|
| 8,510,268 | B1 * | 8/2013 | LaForge | G06F 17/30 705/344 |
| 8,676,804 | B1 * | 3/2014 | Janos | G06F 17/30011 707/705 |
| 8,706,732 | B1 * | 4/2014 | Janos | G06F 17/3087 707/705 |
| 2003/0225571 | A1 * | 12/2003 | Levin | G10L 13/08 704/201 |
| 2004/0101810 | A1 * | 5/2004 | Bright | G09B 19/0061 434/118 |
| 2007/0268310 | A1 * | 11/2007 | Dolph | G06T 17/05 345/629 |
| 2009/0110302 | A1 * | 4/2009 | Snow | G06T 17/05 382/225 |
| 2009/0287546 | A1 * | 11/2009 | Gillespie | G06F 17/30241 705/5 |
| 2010/0023259 | A1 * | 1/2010 | Krumm | G01C 21/20 701/532 |
| 2010/0094910 | A1 | 4/2010 | Bayliss | |
| 2010/0332524 | A1 | 12/2010 | Uchida et al. | |
| 2011/0010364 | A1 | 1/2011 | Ahtisaari et al. | |
| 2011/0010650 | A1 * | 1/2011 | Hess | G06F 3/04817 715/765 |
| 2011/0047509 | A1 * | 2/2011 | Arrasvuori | G01C 21/3673 715/815 |
| 2011/0173197 | A1 * | 7/2011 | Mehta | G06F 17/30864 707/737 |
| 2011/0201317 | A1 | 8/2011 | Karandikar et al. | |
| 2012/0005208 | A1 * | 1/2012 | Guralnik | G06F 17/30781 707/737 |
| 2013/0103293 | A1 * | 4/2013 | Ma | G01C 21/3697 701/118 |
| 2013/0166480 | A1 * | 6/2013 | Popescu | G06N 99/005 706/12 |
| 2013/0181993 | A1 * | 7/2013 | Herring | G06T 11/206 345/440 |
| 2013/0232006 | A1 * | 9/2013 | Holcomb | G06F 17/30864 705/14.54 |

OTHER PUBLICATIONS

Article entitled "Context-aware Collaborative Creation of Semantic Points of Interest as Linked Data", by Braun, dated Sep. 21, 2009.*
Article entitled "Collaborative Semantic Points of Interests", by Braun et al., dated 2010).*

(Continued)

*Primary Examiner* — Mahesh Dwivedi
(74) *Attorney, Agent, or Firm* — IP Investment Law Group

(57) ABSTRACT

A method of operation of a navigation system includes: generating a point of interest record based on normalizing an entry record; calculating a similarity score based on comparing a plurality of the POI record to each other; and generating an affinity group with a control unit based on the similarity score meeting or exceeding an edge weight threshold for displaying on a device.

18 Claims, 8 Drawing Sheets

(56) References Cited

OTHER PUBLICATIONS

Article entitled "Discovering points of interest from users' map annotations", by Mummidi et al., dated Aug. 7, 2008.*

Article entitled "PRO-GRID: A unified spatial data structure", by Tollefson et al., dated Mar. 2012.*

Article entitled "Transforming Population Data for Interdisciplinary Usages: From census to grid", by Deichmann et al., dated Oct. 1, 2001.*

Article entitled "Clustering graphs for visualization via node similarities", by Huang et al. Copyright 2005.*

Hein et al., "Similarity Graphs in Machine Learning—Practical Session on Graph Based Algorithms for Machine Learning", Aug. 2007, pp. 1-23.

Cohen et al., "A Comparison of String Distance Metrics for Name-Matching Tasks", 2003, pp. 1-6, Publisher: American Association for Artificial Intelligence.

* cited by examiner

NAVIGATION SYSTEM WITH CONTENT CURATION MECHANISM AND METHOD OF OPERATION THEREOF

CROSS-REFERENCE TO RELATED APPLICATION(S)

The present application contains subject matter related to a concurrently filed U.S. Patent Application by Jaffe Wong et al. entitled "NAVIGATION SYSTEM WITH DEDUPER MECHANISM AND METHOD OF OPERATION THEREOF." The related pending application is assigned to TeleNav, Inc. and is identified by application Ser. No. 13/785,685. The subject matter thereof is incorporated herein by reference thereto.

TECHNICAL FIELD

The present invention relates generally to a navigation system, and more particularly to a system with content curation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without content curation mechanism has become a paramount concern for the consumer. The inability decreases the benefit of using the tool.

Thus, a need still remains for a navigation system with content curation mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a point of interest (POI) record based on normalizing an entry record; calculating a similarity score based on comparing a plurality of the POI record to each other; and generating an affinity group with a control unit based on the similarity score meeting or exceeding an edge weight threshold for displaying on a device.

The present invention provides a navigation system, including: a preprocessing module for generating a point of interest (POI) record based on normalizing an entry record; a similarity module, coupled to the preprocessing module, for calculating a similarity score based on comparing a plurality of the POI record to each other; and a clustering module, coupled to the similarity module, for generating an affinity group based on the similarity score meeting or exceeding an edge weight threshold for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
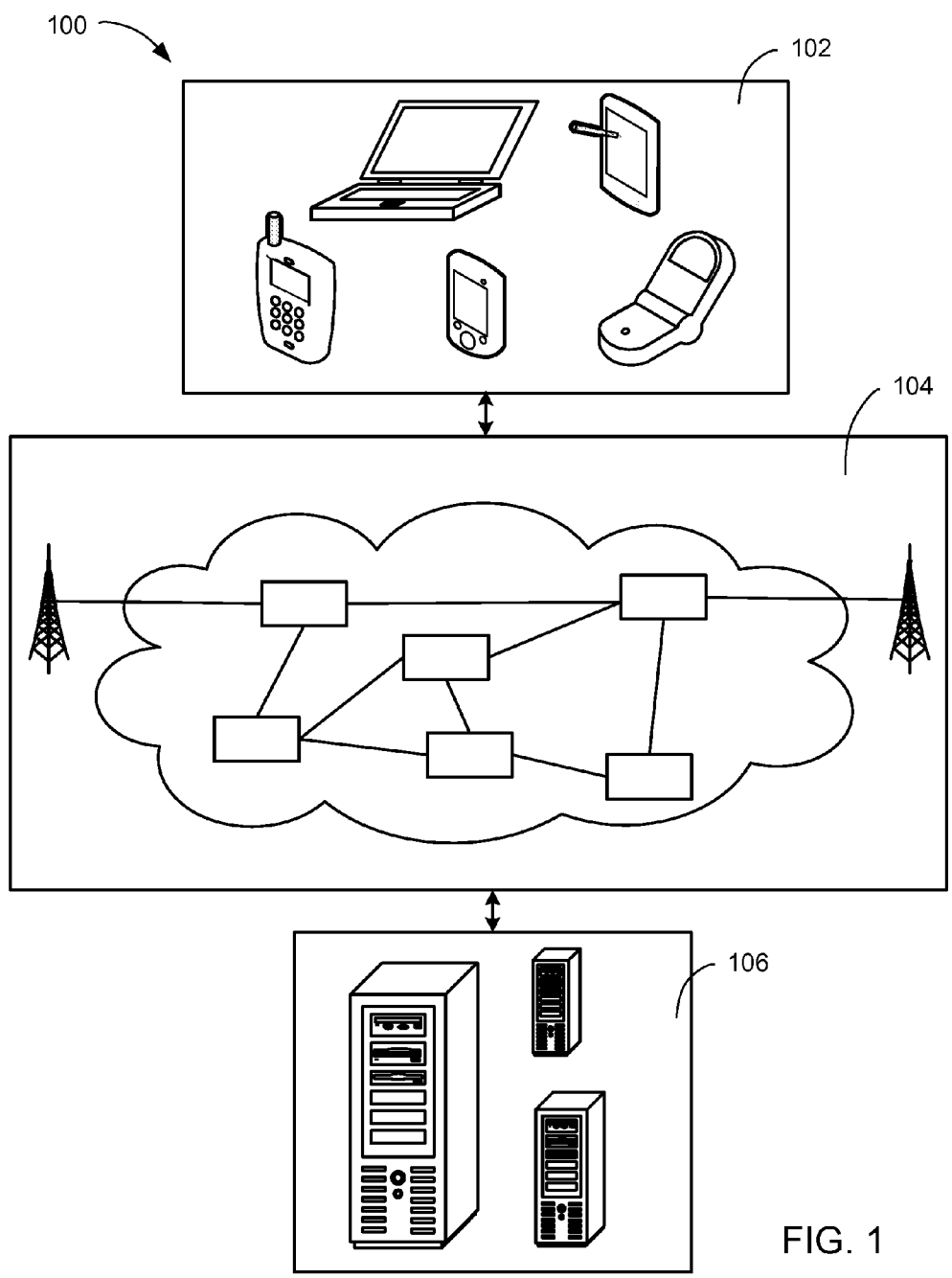
FIG. 1 is a navigation system with content curation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with content curation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
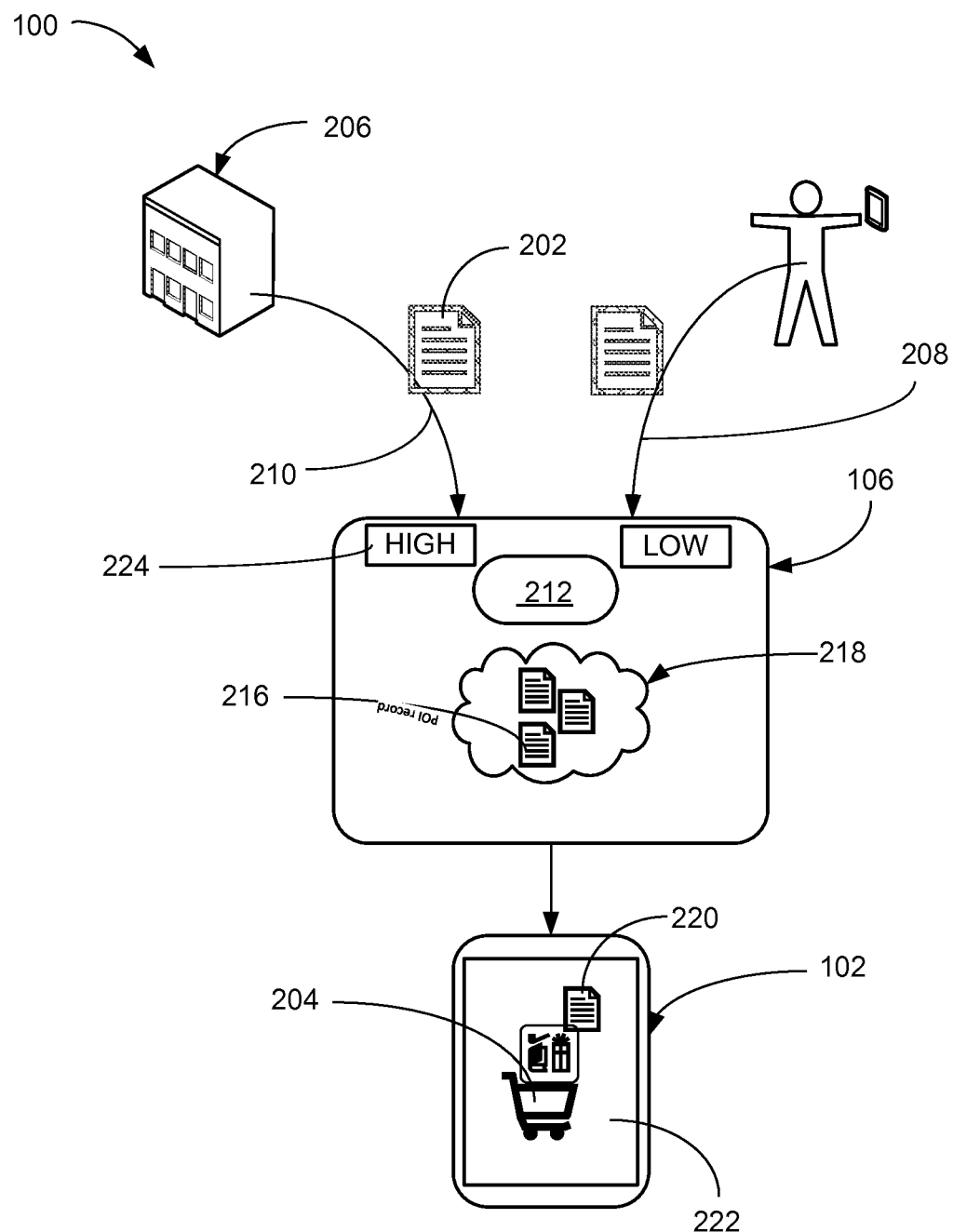
FIG. 2 is an example of the navigation system receiving an entry record for a point of interest (POI) from an entry provider.

Referring now to FIG. 2, therein is shown an example of the navigation system 100 receiving an entry record 202 for a point of interest (POI) 204 from an entry provider 206. The entry record 202 is defined as a representation of the POI 204 provided by the entry provider 206. The entry provider 206 can represent an individual, an entity, or a combination thereof that provides the entry record 202, such as a user generated content 208, an entity generated content 210, or a combination thereof, to the navigation system 100. For clarity and brevity, the discussion of the present invention will focus on the first device 102 displaying the result generated by the navigation system 100. However, the second device 106 and the first device 102 can be discussed interchangeably.

The entry record 202 can be represented in the form of the user generated content 208, the entity generated content 210, or a combination thereof. The user generated content 208 can represent information related to the POI 204 generated by an individual, such as the user of the first device 102, other users, or a combination thereof. For example, the user generated content 208 can represent a report submitted by the user on a rating website. For another example, the user generated content 208 can represent check-in information for the user reaching the POI 204.

The entity generated content 210 can represent information related to the POI 204 generated by an entity, such as a corporation, a non-profit group, or a combination thereof. For example, the entry record 202 can represent information related to the POI 204 representing Walmart™, an American retail store. Moreover, the entry record 202 can represent an incomplete, incorrect, or a combination thereof raw data required by the navigation system 100 to improve the quality. Details regarding the entry record 202 will be discussed below.

The navigation system 100 can include a normalization rule 212 for normalizing the entry record 202 into a POI record 216. The normalization rule 212 is defined as a constraint for normalizing the entry record 202 to generate the POI record 216. Normalizing is defined as to conform the elements to a standard. The standard is defined by a constraint. For example, the navigation system 100 can normalize the entry record 202 according to the normalization rule 212 for generating the POI record 216. Details regarding the normalization rule 212 will be discussed below. The POI record 216 is defined as a representation of the POI 204 normalized based on the normalization rule 212. Details regarding the POI record 216 will be discussed below.

Once the POI record 216 is generated, the navigation system 100 can generate an affinity group 218 to group a plurality of the POI record 216 sharing a similarity. The affinity group 218 is defined as a grouping of the instances of the POI record 216 based on the similarity between the instances. The similarity can be based on a level of corroboration amongst the instances of the POI record 216. The higher the level of corroboration is, the more similar the instances of the POI record 216 are to each other. The affinity group 218 can represent the high level of corroboration by grouping the instances of the POI record 216. As a result, the navigation system 100 can generate an exemplary POI 220 to represent the POI 204. Details will be discussed below.

The exemplary POI 220 is defined as a representative instance of the POI 204. For example, the exemplary POI 220 can represent the corroborated depiction of the POI 204. For a different example, the exemplary POI 220 can represent a representation of the POI 204 most commonly used by the users of the navigation system 100. For a specific example, the exemplary POI 220 for Starbucks Coffee™, an American coffee brand, can represent "Starbucks." The first device 102 can display the exemplary POI 220 and the POI 204 on a display interface 222 of the first device 102.

A priority rank 224 is defined as a level of importance placed on the entry provider 206. For example, the entity provider 206 representing a commercial entity can be valued higher than the entity provider 206 representing an individual. As a result the priority rank 224 for the entity provider 206 representing the commercial entity can be higher than the entity provider 206 representing the individual.

Figure 3:
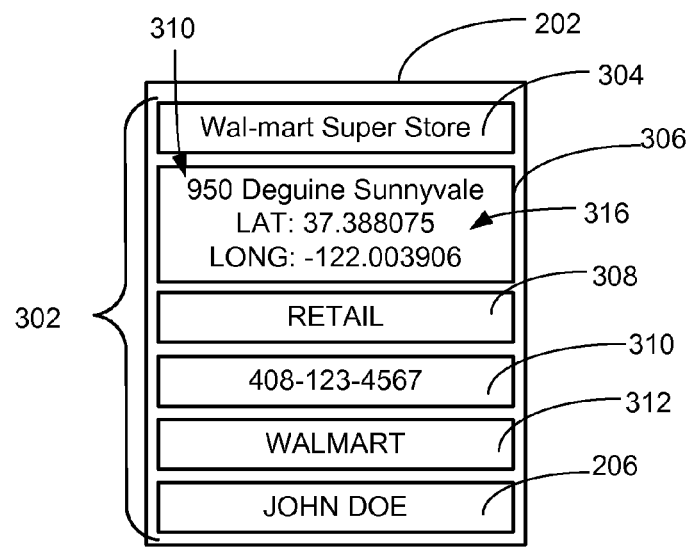
FIG. 3 is an example of the entry record.

Referring now to FIG. 3, therein is shown an example of the entry record 202. The entry record 202 can include an entry attribute 302. For example, the entry attribute 302 can include an entry name 304, location information 306, a category of interest 308, entry contact information 310, brand information 312, the entry provider 206, or a combination thereof.

The entry name 304 can represent the name of the POI 204 of FIG. 2. The category of interest 308 can represent a classification of the POI 204. The entry contact information 310 can represent information regarding a form of communication to contact the POI 204. For example, the entry contact information 310 can represent the telephone number, email, or a combination thereof. The brand information 312 can represent a trade name that serves to identify the POI 204.

The location information 306 can represent geographic information of the POI 204. The location information 306 can include an address information 314, the latitude-longitude information 316, or a combination thereof. The address information 314 can represent the physical address of the POI 204. The latitude-longitude information 316 can represent the latitudinal and longitudinal information of the POI 204.

Figure 4:
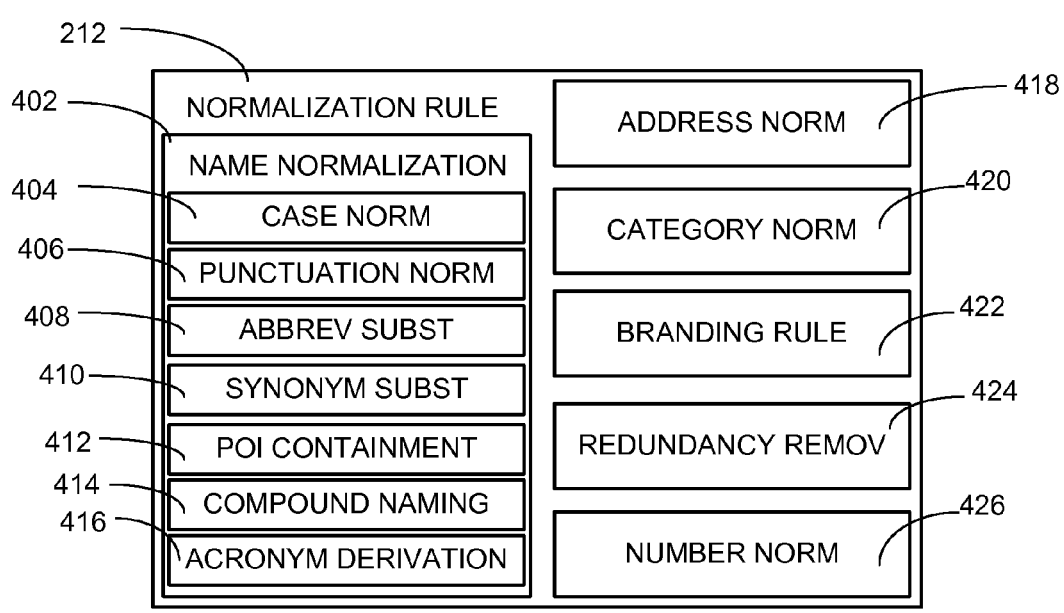
FIG. 4 is an example of the normalization rule. The normalization rule can include a name normalization.

Referring now to FIG. 4, therein is shown an example of the normalization rule 212. The normalization rule 212 can include a name normalization 402. The name normalization 402 is defined as a constraint to a process to normalize or standardize the entry attribute 302 of FIG. 3. For example, the name normalization 402 can include a case normalization 404, a punctuation normalization 406, an abbreviation substitution 408, a synonym substitution 410, a POI containment 412, a compound naming rule 414, an acronym derivation 416, or a combination thereof.

The case normalization 404 can represent a normalization process to convert the alphabets in the entry attribute 302 to all upper case. For example, the entry name 304 of FIG. 3 of "target" can be converted to "TARGET" based on the case normalization 404. The punctuation normalization 406 can represent a normalization process to remove the punctuation from the entry attribute 302. For example, the punctuation normalization 406 can remove the punctuation by spelling out the punctuation. For another example, the punctuation normalization 406 can delete the punctuation, such as hyphens, question marks, or a combination thereof.

The abbreviation substitution 408 can represent a normalization process to convert the abbreviated version of the word in the entry attribute 302 into a full version of the word. For example, the abbreviated version can represent "Inc." and the full version can represent "Incorporation." The synonym substitution 410 can represent a normalization process to convert an instance of a word in the entry attribute 302 with a synonym of that instance of the word. For example, the synonym substitution 410 can convert "BBQ" with a synonym word representing "Barbeque."

The POI containment 412 can represent a normalization process to extract the entry name 304 of the POI 204 of FIG. 2 contained within another instance of the POI 204. For example, the entry name 304 can represent "Starbucks at Stanford Shopping Center." The POI 204 of Starbucks Coffee™, an American coffee shop, can be contained within Stanford Shopping Center™, an American shopping mall. The POI containment 412 can extract the entry name 304 just for Starbucks Coffee™ from the enwrapping instance of the POI 204 representing Stanford Shopping Center™.

The compound naming rule 414 can represent a constraint to convert disjointed instance of the entry name 304 into consistent format. For example, the compound naming rule 414 can define a constraint to a process to convert the disjointed instance, thus misspelled, of the entry name 304 to correct the spelling by removing the unnecessary spacing between the letters. The acronym derivation 416 can represent a normalization process to convert the acronym into full form word. For example, the full form word can represent the naming convention established by the Brand Code. The Brand Code can represent standardized name recognized by industry association, such as Automotive Aftermarket Industry Association™.

The normalization rule 212 can include an address normalization 418. The address normalization 418 can represent a constraint to a process to normalize or standardize the location information 306 of FIG. 3. For example, the address normalization 418 can convert the address information 314 into the following format: Door Number; Street Name; Street Type; City; State; and ZIP.

The normalization rule 212 can include a category normalization 420. The category normalization 420 can represent a constraint to a process to normalize or standardize the category of interest 308 of FIG. 3. For example, the category normalization 420 can establish a category standard based on the Standard Industrial Classification (SIC) code.

The normalization rule 212 can include a branding rule 422. The branding rule 422 is can represent a corroboration process to identify the brand information 312 of FIG. 3. For example, the branding rule 422 can establish a constraint to a process to cross-reference the entry name 304, the location information 306, the category of interest 308, the entry provider 206 of FIG. 3, the brand information 312, or a combination thereof to the Brand Code, SIC, or a combination thereof.

The normalization rule 212 can include a redundancy remover 424. The redundancy remover 424 can represent a constraint to a process to normalize or standardize the entry attribute 302 by removing extraneous information. For example, the entry name 304 can include the location information 306 as part of the entry name 304. The redundancy remover 424 can remove the location information 306 from the entry name 304.

The normalization rule 212 can include a number normalization 426. The number normalization 426 can represent as a constraint to a process to normalize or standardize the entry attribute 302 by spelling out the numbers. For example, the number normalization 426 can spell out the number "89" in the entry name 304 of "Bar 89" as "eighty nine."

Figure 5:
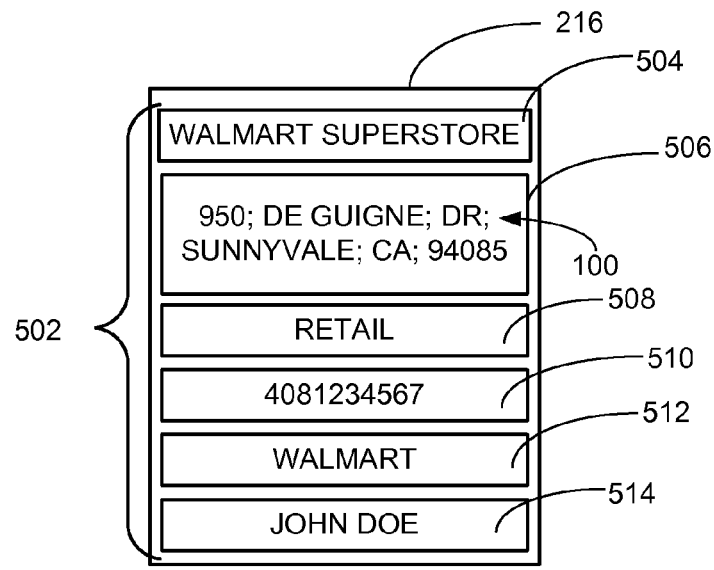
FIG. 5 is an example of a POI record.

Referring now to FIG. 5, therein is shown an example of a POI record 216. The POI record 216 can include a record attribute 502. For example, the record attribute 502 can include a POI name 504, a POI location 506, a POI category 508, a POI contact information 510, a POI brand 512, the entry provider 206, or a combination thereof.

The POI name 504 can represent the name of the POI 204 of FIG. 2 after normalizing the entry name 304 of FIG. 3 according to the normalization rule 212 of FIG. 2. The POI location 506 can represent geographic information of the POI 204 after normalizing the location information 306 of FIG. 3 according to the normalization rule 212. The POI category 508 can represent the classification of the POI 204 after normalizing the category of interest 308 of FIG. 3 according to the normalization rule 212. The POI contact information 510 can represent information regarding a form of communication to contact the POI 204 after normalizing the entry contact information 310 of FIG. 3 according to the normalization rule 212. The POI brand 512 can represent a trade name that serves to identify the POI 204 after normalizing the brand information 312 of FIG. 3 according to the normalization rule 212.

The POI record can be organized according to a POI schema 514. The POI schema 514 can represent the hierarchical structure of the POI record 216.

Figure 6:
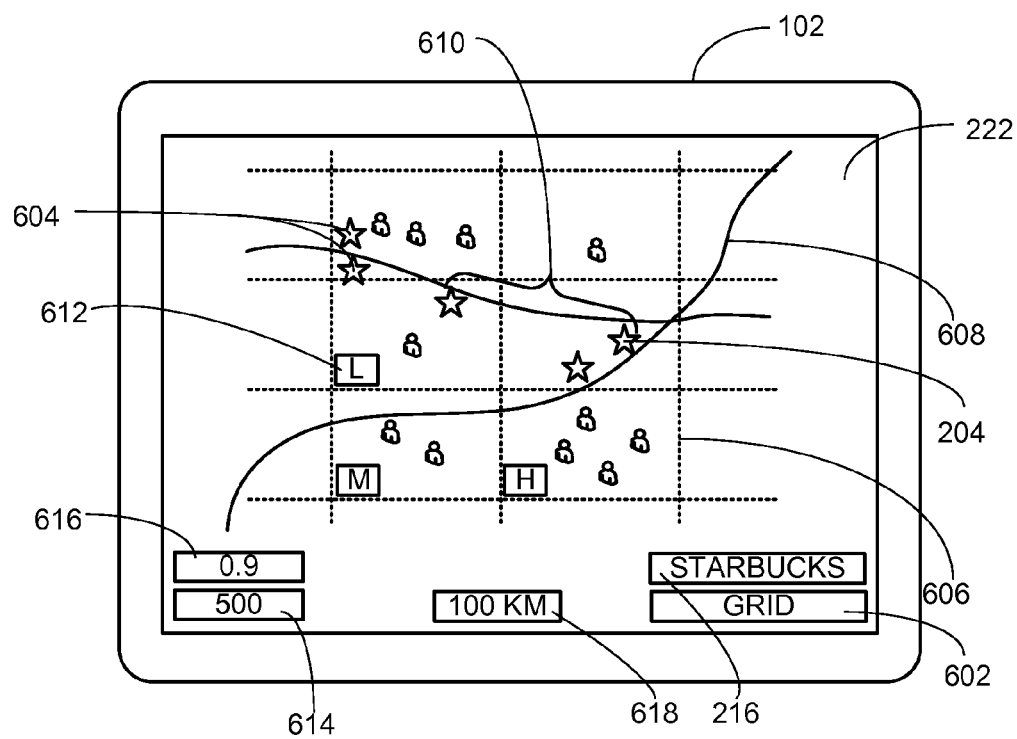
FIG. 6 is an example of the display interface of the first device displaying the POI.

Referring now to FIG. 6, therein is shown an example of the display interface 222 of the first device 102 displaying the POI 204. A partition key 602 is defined as a factor to group a plurality of the POI 204 into a set of smaller number of instances of the POI 204. A record set 604 is defined as a plurality of the POI record 216 after being grouped according to the partition key 602.

The partition key 602 can include a latitude-longitude grid 606, a road network 608, or a combination thereof. The latitude-longitude grid 606 is defined as a geographical boundary to segment one instance of the POI 204 from another instance of the POI 204. The road network 608 is defined as a route that traverses through the geographic area where the POI 204 is located. For example, the road network 608 can represent the street name where the POI 204 is located.

A POI inter-distance 610 is defined as the physical distance from one instance of the POI 204 to another instance of the POI 204. A population density 612 is defined as a number of people living per unit of an area. For example, the population density 612 can be based on a number of people living in the latitude-longitude grid 606. The latitude-longitude grid 606 can be established based on dividing the geographic area until the population density 612 meets or is below a density threshold 614. The density threshold 614 is defined as a maximum number of population within the unit of an area. For example, the density threshold 614 can represent 500 people in the latitude-longitude grid 606.

A distance score 616 is defined as a normalized value of the POI inter-distance 610. The distance score 616 can represent a normalized value of the POI inter-distance 610 factoring the POI category 508, the POI inter-distance 610, the population density 612, a distance threshold 618, or a combination thereof. The distance score 616 can range from 0 to 1. The distance threshold 618 is defined as minimum distance to establish the closeness of the POI inter-distance 610. The distance threshold 618 can be adjusted according to the POI category 508, the population density 612, or a combination thereof.

For example, the POI 204 can represent the POI category 508 of a national park. The distance threshold 618 for the POI 204 representing a national park is 100 kilometers. If the POI inter-distance 610 between the two national parks is 50 kilometers, the two national parks are deemed close in distance based on the POI inter-distance 610 is below the distance threshold 618. In contrast, if the POI inter-distance 610 exceeds the distance threshold 618, the instances of the POI 204 compared are deemed far in distance. Thus, even if the POI inter-distance 610 can seem far in physical distance between the instances of the POI 204, the distance score 616 can represent the normalized value of the POI inter-distance 610 adjusted to the POI category 508.

Figure 7:
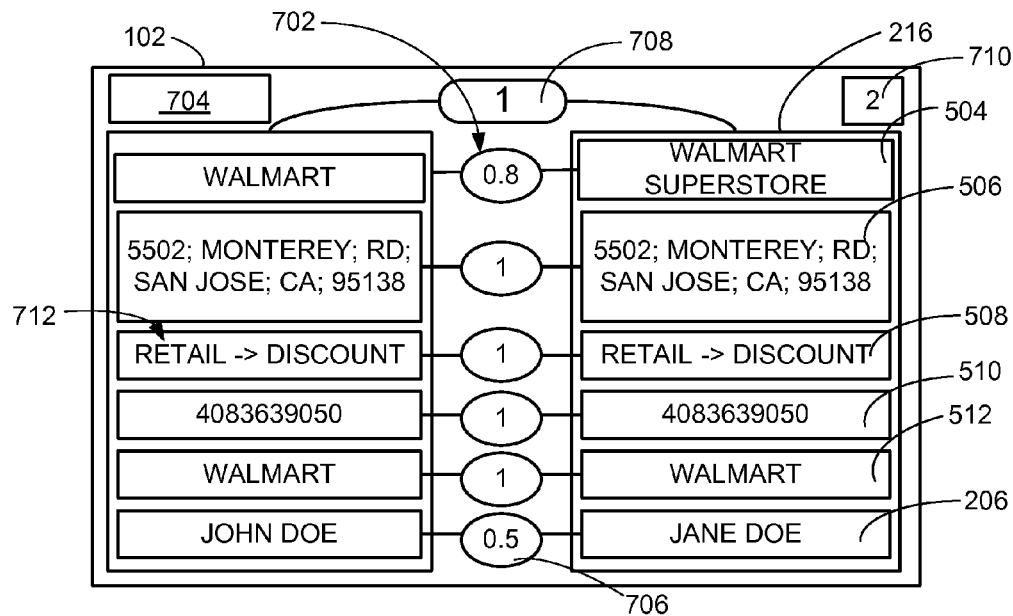
FIG. 7 is an example of comparing two instances of the POI record.

Referring now to FIG. 7, therein is shown an example of comparing two instances of the POI record 216. For example, the first device 102 can compare instances of the POI record 216 for calculating a similarity score 702 based on a scoring rule 704. The similarity score 702 is defined as a value representing a level of similarity between the instances of the POI record 216. The similarity score 702 can be calculated based on string similarity comparison algorithm. The similarity score 702 can range from 0 to 1. The scoring rule 704 is defined as a formula to calculate the similarity score 702. Details regarding the scoring rule 704 will be discussed below.

The similarity score 702 can include an overall score, an attribute score 706, or a combination thereof. The attribute score 706 is defined as a value representing a level of similarity after comparing the record attribute 502 of one instance of the POI record 216 to the record attribute 502 of another instance of the POI record 216. The attribute score 706 can range from 0 to 1. For example, the attribute score 706 for comparing two instances of the POI name 504 can represent 0.8. For another example, the attribute score 706 for comparing two instances of the POI location 506, the POI category 508, the POI contact information 510, and the POI brand 512 can represent 1 for each instances of the record attribute 502. For a different example, the attribute score 706 for comparing the instances of the entry provider 206 can represent 0.5.

The overall score 708 is defined as a value representing a level of similarity for comparing instances of the attribute score 706. The overall score 708 can range from 0 to 1. For example, the overall score 708 can compare the attribute score 706 according to the scoring rule 704.

An attribute frequency 710 is defined as a number of times the same instances of a value for of the record attribute 502 appearing in a plurality of the POI record 216. As illustrated in the figure, the attribute frequency 710 for the POI contact information 510 can represent 2. The attribute frequency 710 can represent 2 based on the value "4083639050" are shared amongst the two instances of the POI record 216.

A category hierarchy 712 is defined as a hierarchical structure of organizing the POI category 508. For example, the POI record 216 representing Walmart™ can be organized with the category hierarchy 712 of "Retail store->Discount store." More specifically, Walmart™ can be organized under the category of retail store. For further example, Walmart™ can be further organized under the category of discount store within the retail store.

Figure 8:
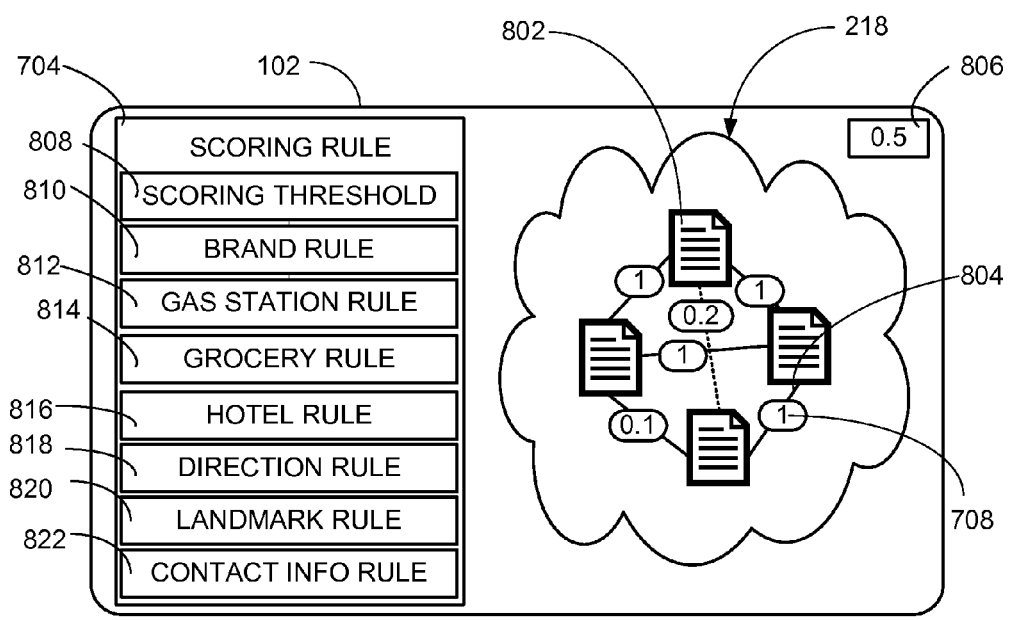
FIG. 8 is an example of the affinity group grouping the POI record of FIG. 2 within the first device.

Referring now to FIG. 8, therein is shown an example of the affinity group 218 grouping the POI record 216 of FIG. 2 within the first device 102. The affinity group 218 can include one instance of a record node 802 connecting to another instance of the record node 802 with a record edge 804. The record node 802 can represent the POI record 216. The record edge 804 can represent the level of similarity expressed by the overall score 708.

An edge weight threshold 806 is defined as a minimum value of the overall score 708 required to connect one instance of the record node 802 with another instance of the record node 802. For example, the edge weight threshold 806 can represent 0.5. If the overall score 708 of the record edge 804 meets or exceeds the edge weight threshold 806, the record edge 804 can be illustrated as a solid line. In contrast, if the overall score 708 is below the edge weight threshold 806, the record edge 804 can be illustrated as a dotted line.

The dotted line can represent a severance between the instances of the record node 802. In other words, the POI record 216 that is highly corroborated can have the record edge 804 intact between the instances of the record node 802. However, the POI record 216 with low corroboration can represent the overall score 708 less than the edge weight threshold 806. As a result, the navigation system 100 of FIG. 1 can filter the entry record 202 of FIG. 2 representing spam, as spam will likely be less corroborated.

The scoring rule 704 can factor a scoring threshold 808. The scoring threshold 808 is defined as the minimum value of the attribute score 706 of FIG. 7 required. The scoring rule 704 can include a brand rule 810, a gas station rule 812, a grocery rule 814, a hotel rule 816, a direction rule 818, a landmark rule 820, a contact information rule 822, or a combination thereof.

The brand rule 810 can represent formula for comparing instances of the attribute score 706 including the POI brand 512. The gas station rule 812 can represent a formula for comparing instances of the attribute score 706 for the POI category 508 of FIG. 5 representing a gas station. The grocery rule 814 can represent a formula for comparing instances of the attribute score 706 for the POI category 508 of a grocery store. The hotel rule 816 can represent a formula for comparing instances of the attribute score 706 for the POI category 508 of a hotel. The direction rule 818 can represent a formula for comparing instances of the attribute score 706 including the POI location 506. The landmark rule 820 can represent a formula for comparing instances of the attribute score 706 for the POI category 508 of a landmark. The contact information rule 822 can represent a formula for comparing instances of the attribute score 706 including the POI contact information 510.

Figure 9:
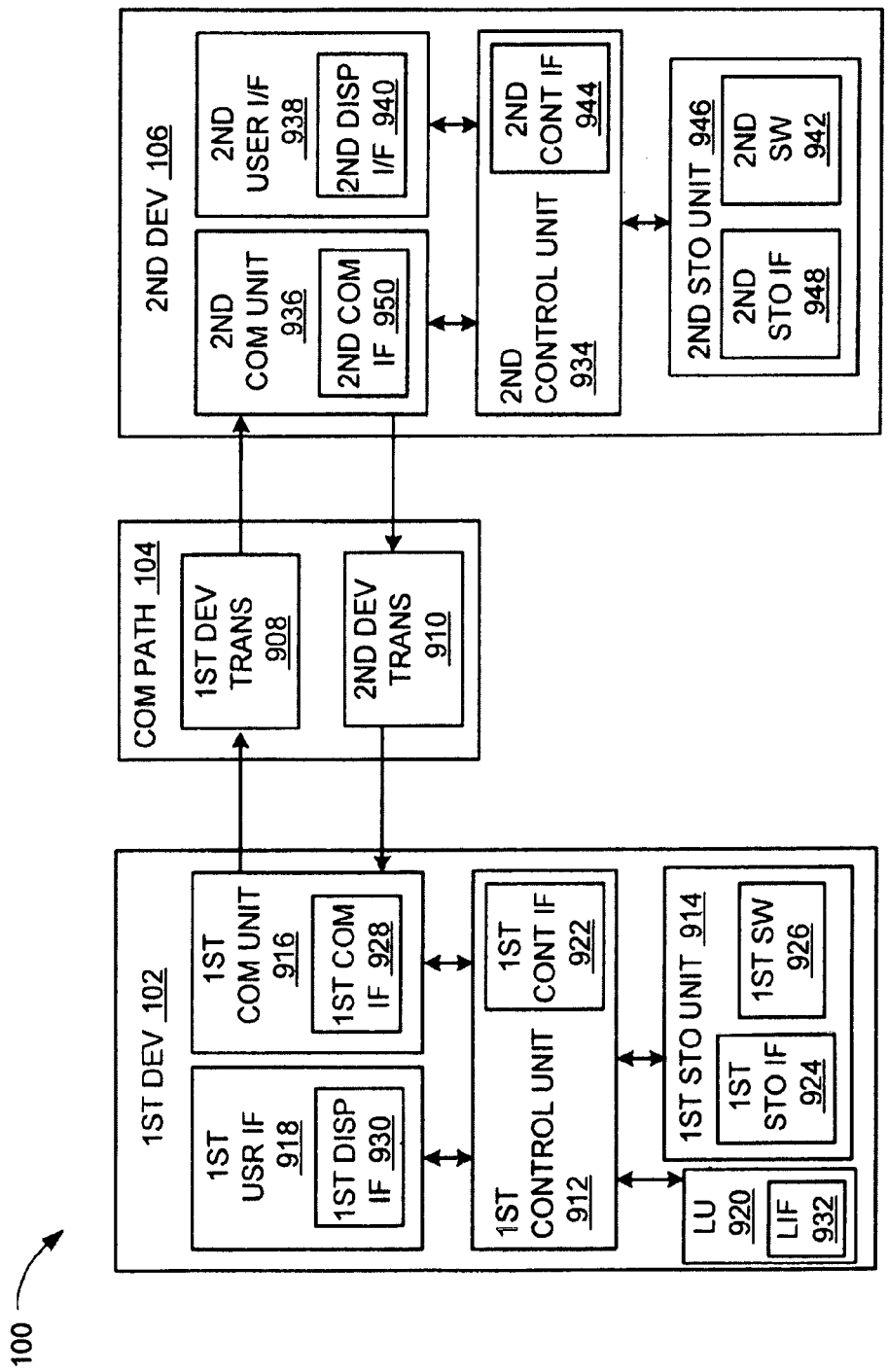
FIG. 9 is an exemplary block diagram of the navigation system.

Referring now to FIG. 9, therein is shown an exemplary block diagram of the navigation system 100. The navigation system 100 can include the first device 102, the communication path 104, and the second device 106. The first device 102 can send information in a first device transmission 908 over the communication path 104 to the second device 106. The second device 106 can send information in a second device transmission 910 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 912, a first storage unit 914, a first communication unit 916, a first user interface 918, and a location unit 920. The first control unit 912 can include a first control interface 922. The first control unit 912 can execute a first software 926 to provide the intelligence of the navigation system 100. The first control unit 912 can be implemented in a number of different manners. For example, the first control unit 912 can be a processor, an embedded processor, a microprocessor, a hardware control logic, a hardware finite state machine (FSM), a digital signal processor (DSP), or a combination thereof.

The first control interface 922 can be used for communication between the first control unit 912 and other functional units in the first device 102. The first control interface 922 can also be used for communication that is external to the first device 102.

The first control interface 922 can receive information from the other functional units or from external sources, or can transmit information to the other functional units or to external destinations. The external sources and the external destinations refer to sources and destinations physically separate from the first device 102.

The first control interface 922 can be implemented in different ways and can include different implementations depending on which functional units or external units are being interfaced with the first control interface 922. For example, the first control interface 922 can be implemented with a pressure sensor, an inertial sensor, a microelectromechanical system (MEMS), optical circuitry, waveguides, wireless circuitry, wireline circuitry, or a combination thereof.

The location unit 920 can generate location information, current heading, and current speed of the first device 102, as examples. The location unit 920 can be implemented in many ways. For example, the location unit 920 can function as at least a part of a global positioning system (GPS), an inertial navigation system, a cellular-tower location system, a pressure location system, or any combination thereof.

The location unit 920 can include a location interface 932. The location interface 932 can be used for communication between the location unit 920 and other functional units in the first device 102. The location interface 932 can also be used for communication that is external to the first device 102.

The location interface 932 can receive information from the other functional units or from external sources, or can transmit information to the other functional units or to external destinations. The external sources and the external destinations refer to sources and destinations physically separate from the first device 102.

The location interface 932 can include different implementations depending on which functional units or external units are being interfaced with the location unit 920. The location interface 932 can be implemented with technologies and techniques similar to the implementation of the first control interface 922.

The first storage unit 914 can store the first software 926. The first storage unit 914 can also store the relevant information, such as advertisements, points of interest (POI), navigation routing entries, or any combination thereof.

The first storage unit 914 can be a volatile memory, a nonvolatile memory, an internal memory, an external memory, or a combination thereof. For example, the first storage unit 914 can be a nonvolatile storage such as non-volatile random access memory (NVRAM), Flash memory, disk storage, or a volatile storage such as static random access memory (SRAM).

The first storage unit 914 can include a first storage interface 924. The first storage interface 924 can be used for communication between the location unit 920 and other functional units in the first device 102. The first storage interface 924 can also be used for communication that is external to the first device 102.

The first storage interface 924 can receive information from the other functional units or from external sources, or can transmit information to the other functional units or to external destinations. The external sources and the external destinations refer to sources and destinations physically separate from the first device 102.

The first storage interface 924 can include different implementations depending on which functional units or external units are being interfaced with the first storage unit 914. The first storage interface 924 can be implemented with technologies and techniques similar to the implementation of the first control interface 922.

The first communication unit 916 can enable external communication to and from the first device 102. For example, the first communication unit 916 can permit the first device 102 to communicate with the second device 106, an attachment, such as a peripheral device or a computer desktop, and the communication path 104.

The first communication unit 916 can also function as a communication hub allowing the first device 102 to function as part of the communication path 104 and not limited to be an end point or terminal unit to the communication path 104. The first communication unit 916 can include active and passive components, such as microelectronics or an antenna, for interaction with the communication path 104.

The first communication unit 916 can include a first communication interface 928. The first communication interface 928 can be used for communication between the first communication unit 916 and other functional units in the first device 102. The first communication interface 928 can receive information from the other functional units or can transmit information to the other functional units.

The first communication interface 928 can include different implementations depending on which functional units are being interfaced with the first communication unit 916. The first communication interface 928 can be implemented with technologies and techniques similar to the implementation of the first control interface 922.

The first user interface 918 allows a user (not shown) to interface and interact with the first device 102. The first user interface 918 can include an input device and an output device. Examples of the input device of the first user interface 918 can include a keypad, a touchpad, soft-keys, a keyboard, a microphone, or any combination thereof to provide data and communication inputs.

The first user interface 918 can include a first display interface 930. The first display interface 930 can include a display, a projector, a video screen, a speaker, or any combination thereof.

The first control unit 912 can operate the first user interface 918 to display information generated by the navigation system 100. The first control unit 912 can also execute the first software 926 for the other functions of the navigation system 100, including receiving location information from the location unit 920. The first control unit 912 can further execute the first software 926 for interaction with the communication path 104 via the first communication unit 916.

The second device 106 can be optimized for implementing the present invention in a multiple device embodiment with the first device 102. The second device 106 can provide the additional or higher performance processing power compared to the first device 102. The second device 106 can include a second control unit 934, a second communication unit 936, and a second user interface 938.

The second user interface 938 allows a user (not shown) to interface and interact with the second device 106. The second user interface 938 can include an input device and an output device. Examples of the input device of the second user interface 938 can include a keypad, a touchpad, soft-keys, a keyboard, a microphone, or any combination thereof to provide data and communication inputs. Examples of the output device of the second user interface 938 can include a second display interface 940. The second display interface 940 can include a display, a projector, a video screen, a speaker, or any combination thereof.

The second control unit 934 can execute a second software 942 to provide the intelligence of the second device 106 of the navigation system 100. The second software 942 can operate in conjunction with the first software 926. The second control unit 934 can provide additional performance compared to the first control unit 912.

The second control unit 934 can operate the second user interface 938 to display information. The second control unit 934 can also execute the second software 942 for the other functions of the navigation system 100, including operating the second communication unit 936 to communicate with the first device 102 over the communication path 104.

The second control unit 934 can be implemented in a number of different manners. For example, the second control unit 934 can be a processor, an embedded processor, a microprocessor, a hardware control logic, a hardware finite state machine (FSM), a digital signal processor (DSP), or a combination thereof.

The second control unit 934 can include a second control interface 944. The second control interface 944 can be used for communication between the second control unit 934 and other functional units in the second device 106. The second control interface 944 can also be used for communication that is external to the second device 106.

The second control interface 944 can receive information from the other functional units or from external sources, or can transmit information to the other functional units or to external destinations. The external sources and the external destinations refer to sources and destinations physically separate from the second device 106.

The second control interface 944 can be implemented in different ways and can include different implementations depending on which functional units or external units are being interfaced with the second control interface 944. For example, the second control interface 944 can be implemented with a pressure sensor, an inertial sensor, a microelectromechanical system (MEMS), optical circuitry, waveguides, wireless circuitry, wireline circuitry, or a combination thereof.

A second storage unit 946 can store the second software 942. The second storage unit 946 can also store the relevant information, such as advertisements, points of interest (POI), navigation routing entries, or any combination thereof. The second storage unit 946 can be sized to provide the additional storage capacity to supplement the first storage unit 914.

For illustrative purposes, the second storage unit 946 is shown as a single element, although it is understood that the second storage unit 946 can be a distribution of storage elements. Also for illustrative purposes, the navigation system 100 is shown with the second storage unit 946 as a single hierarchy storage system, although it is understood that the navigation system 100 can have the second storage unit 946 in a different configuration. For example, the second storage unit 946 can be formed with different storage technologies forming a memory hierarchal system including different levels of caching, main memory, rotating media, or off-line storage.

The second storage unit 946 can be a volatile memory, a nonvolatile memory, an internal memory, an external memory, or a combination thereof. For example, the second storage unit 946 can be a nonvolatile storage such as non-volatile random access memory (NVRAM), Flash memory, disk storage, or a volatile storage such as static random access memory (SRAM).

The second storage unit 946 can include a second storage interface 948. The second storage interface 948 can be used for communication between the location unit 920 and other functional units in the second device 106. The second storage interface 948 can also be used for communication that is external to the second device 106.

The second storage interface 948 can receive information from the other functional units or from external sources, or can transmit information to the other functional units or to external destinations. The external sources and the external destinations refer to sources and destinations physically separate from the second device 106.

The second storage interface 948 can include different implementations depending on which functional units or external units are being interfaced with the second storage unit 946. The second storage interface 948 can be implemented with technologies and techniques similar to the implementation of the second control interface 944.

The second communication unit 936 can enable external communication to and from the second device 106. For example, the second communication unit 936 can permit the second device 106 to communicate with the first device 102 over the communication path 104.

The second communication unit 936 can also function as a communication hub allowing the second device 106 to function as part of the communication path 104 and not limited to be an end point or terminal unit to the communication path 104. The second communication unit 936 can include active and passive components, such as microelectronics or an antenna, for interaction with the communication path 104.

The second communication unit 936 can include a second communication interface 950. The second communication interface 950 can be used for communication between the second communication unit 936 and other functional units in the second device 106. The second communication interface 950 can receive information from the other functional units or can transmit information to the other functional units.

The second communication interface 950 can include different implementations depending on which functional units are being interfaced with the second communication unit 936. The second communication interface 950 can be implemented with technologies and techniques similar to the implementation of the second control interface 944.

The first communication unit 916 can couple with the communication path 104 to send information to the second device 106 in the first device transmission 908. The second device 106 can receive information in the second communication unit 936 from the first device transmission 908 of the communication path 104.

The second communication unit 936 can couple with the communication path 104 to send information to the first device 102 in the second device transmission 910. The first device 102 can receive information in the first communication unit 916 from the second device transmission 910 of the communication path 104. The navigation system 100 can be executed by the first control unit 912, the second control unit 934, or a combination thereof.

For illustrative purposes, the second device 106 is shown with the partition having the second user interface 938, the second storage unit 946, the second control unit 934, and the second communication unit 936, although it is understood that the second device 106 can have a different partition. For example, the second software 942 can be partitioned differently such that some or all of its function can be in the second control unit 934 and the second communication unit 936. Also, the second device 106 can include other functional units not shown in FIG. 9 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 920, although it is understood that the second device 106 can also operate the location unit 920.

Figure 10:
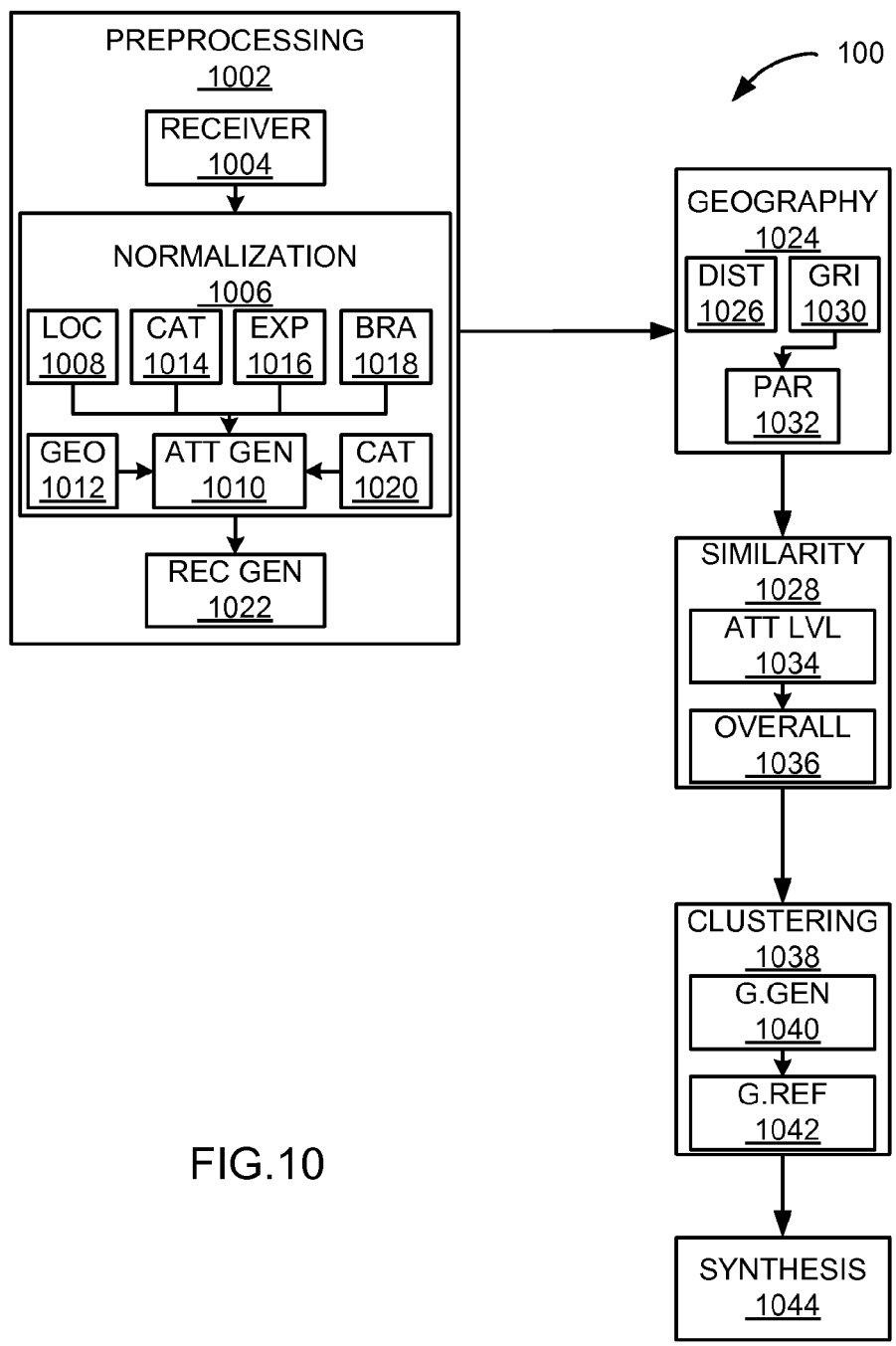
FIG. 10 is a control flow of the navigation system.
Figure 11:
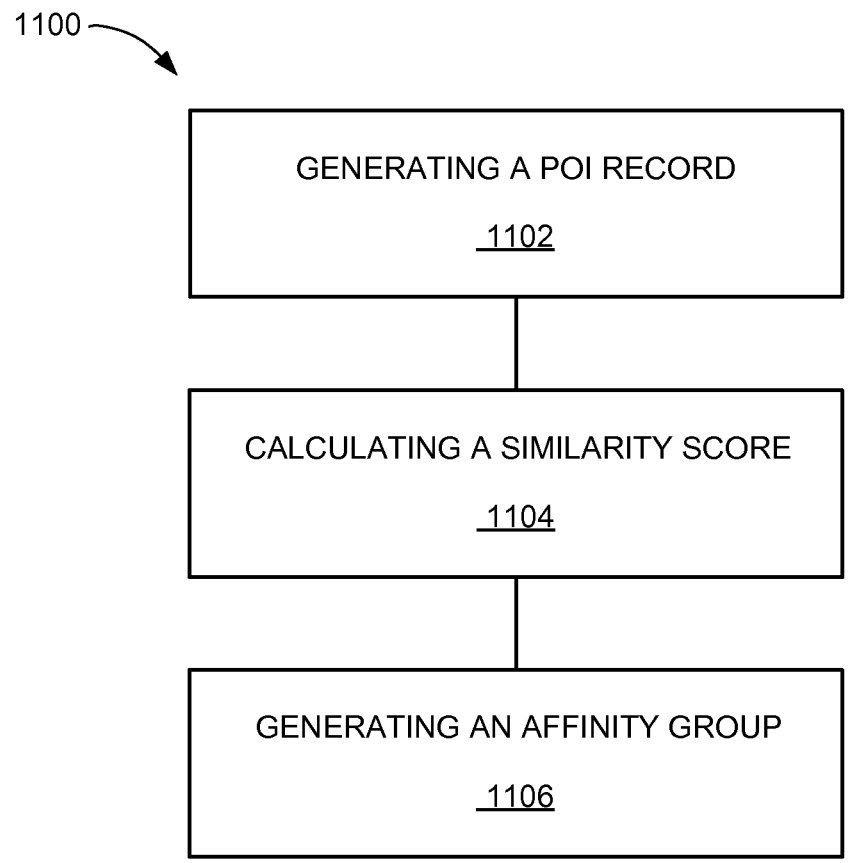
FIG. 11 is a flow chart of a method of operation of the navigation system in a further embodiment of the present invention.

Referring now to FIG. 10, therein is shown a control flow of the navigation system 100. The navigation system 100 can include a preprocessing module 1002. The preprocessing module 1002 generates the POI record 216 of FIG. 2. For example, the preprocessing module 1002 can generate the POI record 216 based on converting the entry record 202 of FIG. 2 according to the POI schema 514 of FIG. 5. For further example, the preprocessing module 1002 can generate the POI record 216 based on normalizing the entry record 202.

The preprocessing module 1002 can include a receiver module 1004. The receiver module 1004 receives the entry record 202. For example, the receiver module 1004 can receive the entry record 202 from the entry provider 206 of FIG. 2.

The receiver module 1004 can receive the entry record 202 in a number of ways. For example, the receiver module 1004 can receive the entry record 202 via the first control interface 922 of FIG. 9 from the entry provider 206. More specifically, the receiver module 1004 can receive the entry record 202 having a plurality of the entry attribute 302 of FIG. 3. The entry attribute 302 can include the category of interest 308 of FIG. 3, the location information 306 of FIG. 3, the brand information 312 of FIG. 3, or a combination thereof. The entry attribute 302 can also include the entry name 304 of FIG. 3, the entry contact information 310 of FIG. 3, the entry provider 206 of FIG. 2, or a combination thereof. The location information 306 can include the address information 314 of FIG. 3, the latitude-longitude information 316 of FIG. 3, or a combination thereof.

The entry provider 206 can include the external sources, such as the user, the other user, the commercial entity, or a combination thereof. The commercial entity can include YP.com™, an American recommendation site. The receiver module 1004 can receive the entry record 202 in the format of the user generated content 208 of FIG. 2, the entity generated content 210 of FIG. 2, or a combination thereof. More specifically, the receiver module 1004 can receive the entry record 202 representing the user generated content 208 from the user, the other user, or a combination thereof. The receiver module 1004 can receive the entity generated content 210 from the commercial entity. The receiver module 1004 can send the entry record 202 to a normalization module 1006.

The preprocessing module 1002 can include the normalization module 1006, which can couple to the receiver module 1004. The normalization module 1006 generates the record attribute 502 of FIG. 5. For example, the normalization module 1006 can generate the record attribute 502 based on aggregating the POI location 506 of FIG. 5, the POI category 508 of FIG. 5, the POI name 504 of FIG. 5, the POI location 506 of FIG. 5, the POI brand 512 of FIG. 5, or a combination thereof.

The normalization module 1006 can generate the record attribute 502 in a number of ways. The normalization module 1006 can include a location module 1008. The location module 1008 generates the POI location 506. For example, the location module 1008 can generate the POI location 506 based on normalizing the entry attribute 302.

The location module 1008 can generate the POI location 506 in a number of ways. For example, the location module 1008 can generate the POI location 506 based on the normalization rule 212 of FIG. 2 for normalizing the entry attribute 302 representing the location information 306. More specifically, the normalization rule 212 can represent the address normalization 418 of FIG. 4 for normalizing the location information 306 representing the address information 314.

As discussed above, the address normalization 418 can define the process for the location module 1008 to normalize the address information 314. For example, the address information 314 for the entry record 202 can include a plurality of the city for the POI 204 of FIG. 2. For a specific example, the POI 204 can list different cities, such as Burlingame, Calif. and Hillsborough, Calif., for the POI 204 because the POI 204 can locate at a city border, thus, raising the possibility of the POI 204 to locate in two cities.

The location module 1008 can normalize the address information 314 based on the address normalization 418 by cross-referencing the address information 314 with map data to determine the canonical form of the address information 314. The canonical form can represent official information provided by, for example, the government for the POI 204. The map data can represent geographical information provided by external sources, such as the government, the OpenStreetMap™, or a combination thereof. The location module 1008 can receive the map data from the external sources via the first control interface 922. The canonical form of the address information 314 for the POI 204 can represent Burlingame, Calif. The location module 1008 can generate the POI location 506 with the canonical form of the address information 314 representing Burlingame, Calif.

For another example, the location module 1008 can generate the POI location 506 based on the address normalization 418 for formatting the address information 314. The address normalization 418 can define the structure to organize the address information 314. More specifically, the location module 1008 can generate the POI location 506 by parsing, reorganizing, correcting, or a combination thereof the address information 314 according to the address normalization 418.

For a specific example, the structure defined by the address normalization 418 can represent the following: Door Number; Street Name; Street Type; City; State; and ZIP. The entry record 202 can include the following instance of the address information 314: 950 Deguine Dr, Sunnyvale." The location module 1008 can correct, for example the spelling, the address information 314 by cross-referencing the address information 314 with the map data by changing the address information 314 from "Deguine" to "De Guigne." The location module 1008 can generate the POI location 506 by normalizing the address information 314 according to the address normalization 418 for the following structure: Door Number: 950; Streen Name: De Guigne; Street Type: Drive; City: Sunnyvale; State: California; and ZIP: 94085. The location module 1008 can send the POI location 506 to an attribute generator module 1010.

The normalization module 1006 can include a geocoding module 1012. The geocoding module 1012 determines the POI location 506. For example, the geocoding module 1012 can determine the POI location 506 representing the latitude-longitude information 316, the address information 314, or a combination thereof.

The geocoding module 1012 can determine the POI location 506 in a number of ways. For example, the geocoding module 1012 can determine the POI location 506 representing the latitude-longitude information 316 based on the address information 314. More specifically, the geocoding module 1012 can determine the POI location 506 via the location unit 920 of FIG. 9 to determine the latitudinal and longitudinal geographic information for the address information 314.

For a different example, the geocoding module 1012 can determine the POI location 506 representing the address information 314 based on the latitude-longitude information 316. More specifically, the geocoding module 1012 can determine the POI location 506 via the location unit 920 to determine the physical address of the POI 204 based on the latitude-longitude information 316. The geocoding module 1012 can send the POI location 506 to the attribute generator module 1010.

The normalization module 1006 can include a category module 1014. The category module 1014 generates the POI category 508. For example, the category module 1014 can generate the POI category 508 based on normalizing the entry attribute 302 representing the category of interest 308.

The category module 1014 can generate the POI category 508 in a number of ways. For example, the category module 1014 can generate the POI category 508 based on the normalization rule 212. More specifically, the category module 1014 can generate the POI category 508 based on the category normalization 420 of FIG. 4 for normalizing the entry attribute 302 representing the category of interest 308.

For a specific example, the category normalization 420 can define the category standard to have a single consistent category to represent the category of interest 308. For example, the category of interest 308 of the POI 204 related to "ice cream" can be represented as "Gelateria" or "Ice Cream Parlor." The category normalization 420 can define the category standard for the POI 204 related to "ice cream" as "Ice Cream Shop." As a result, the category module 1014 can generate the POI category 508 as "Ice Cream Shop" based on the category normalization 420 to normalize and standardize a plurality of the category of interest 308 that could be related to "ice cream." The category module 1014 can send the POI category 508 to the attribute generator module 1010.

The normalization module 1006 can include an expansion module 1016. The expansion module 1016 generates the POI name 504. For example, the expansion module 1016 can generate the POI name 504 based on normalizing the entry attribute 302 representing the entry name 304.

The expansion module 1016 can generate the POI name 504 in a number of ways. For example, the expansion module 1016 can generate the POI name 504 based on the normalization rule 212 representing the name normalization 402 of FIG. 4. For a specific example, the name normalization 402 can represent the case normalization 404 of FIG. 4. The expansion module 1016 can generate the POI name 504 by converting each letters of the entry name 304 into upper case based on the case normalization 404.

For another example, the name normalization 402 can represent the punctuation normalization 406 of FIG. 4. Based on the punctuation normalization 406, the expansion module 1016 can generate the POI name 504 by spelling out the punctuation. For a specific example, the expansion module 1016 can generate the POI name 504 by converting the entry name 304 having "&" to "and" based on the punctuation normalization 406.

For another example, the name normalization 402 can represent the abbreviation substitution 408 of FIG. 4. The expansion module 1016 can generate the POI name 504 by converting the entry name 304 having an abbreviated version of the word, such as "Corp," to full version of the word, such as "Corporation" based on the abbreviation substitution 408.

For another example, the name normalization 402 can represent the synonym substitution 410 of FIG. 4. The expansion module 1016 can generate the POI name 504 by converting the entry name 304 having "BBQ" to an equivalent word of "Barbeque" based on the synonym substitution 410.

For another example, the name normalization 402 can represent the POI containment 412 of FIG. 4. Some of the POI 204 can be contained within another instance of the POI 204. For example, the main instance of the POI 204 representing Starbucks Coffee™ can be contained in the enwrapping instance of the Stanford Shopping Center™. Thus, the entry name 304 can represent "Starbucks at Stanford Shopping Center." The expansion module 1016 can generate the POI name 504 by extracting the main instance of the POI 204 from the entry name 304. More specifically, the expansion module 1016 can generate the POI name 504 by removing the containing or enwrapping instance of POI 204 from the entry name 304. As a result, the POI name 504 can represent "Starbucks" instead of "Starbucks at Stanford Shopping Center."

For another example, the name normalization 402 can represent the acronym derivation 416 of FIG. 4. The acronym derivation 416 can define the rule to expand the acronym into full form word. The acronym derivation 416 can also define a process for the expansion module 1016 to cross-reference the acronym to a list of full form word using the acronym, the location information 306, the category of interest 308, or a combination thereof. For a specific example, "CSP" can correlate to "Central Parking System." The address information 314 of the POI 204 can have the category of interest 308 of "Parking Service." The expansion module 1016 can generate the POI name 504 by converting the entry name 304 having the acronym "CPS" into "Central Parking System" based on the acronym derivation 416 to cross-reference between the full name, the address information 314 and the category of interest 308.

For another example, the name normalization 402 can represent the compound naming rule 414 of FIG. 4. The compound naming rule 414 can define a process for the expansion module 1016 to cross-reference the entry name 304 to the full form word. For example, the entry name 304 can represent "Wal-mart Super Center." And the full form word can represent "Walmart Supercenter." The expansion module 1016 can generate the POI name 504 by converting the entry name 304 represented as "Wal-mart Super Center" into consistent format defined in the compound naming rule 414 as "Walmart Supercenter."

For a different example, the expansion module 1016 can generate the POI name 504 based on the normalization rule 212 representing the redundancy remover 424 of FIG. 4. Some instances of the POI 204 can include location information 306, such as the city name, as part of the entry name 304. The expansion module 1016 can generate the POI name 504 by removing the location information 306 from the entry name 304. For example, the expansion module 1016 can generate the POI name 504 based on the redundancy remover 424 by converting "Sunnyvale Chamber of Commerce" to "Chamber of Commerce."

For another example, some instance of the POI 204 can have the entry name 304 with numbers. For example, the POI 204 can have entry name 304 of "Allsup's #123." The expansion module 1016 can generate the POI name 504 based on the redundancy remover 424 by removing the numbers from the entry name 304 to generate "Allsup's."

For a different example, the expansion module 1016 can generate the POI name 504 based on the normalization rule 212 representing the number normalization 426 of FIG. 4. The expansion module 1016 can generate the POI name 504 based on the number normalization 426 by converting the entry name 304 having numbers, such as "Bar 89," to number words, such as "Bar Eighty-Nine." For another example, the expansion module 1016 can generate the POI name 504 based on the number normalization 426 by converting the entry name 304 having ordinal numbers, such as "21$^{st}$ Amendment Brewery" to number ordinal words, such as "Twenty-First Amendment Brewery." The expansion module 1016 can send the POI name 504 to the attribute generator module 1010.

The normalization module 1006 can include a branding module 1018. The branding module 1018 generates the POI brand 512 of FIG. 5. For example, the branding module 1018 can generate the POI brand 512 based on the branding rule 422 of FIG. 4.

The branding module 1018 can generate the POI brand 512 in a number of ways. For example, the branding rule 422 can define the process to identify the brand information 312 for the entry record 202. More specifically, the branding module 1018 can generate the POI brand 512 based on the branding rule 422 factoring the entry name 304, the location information 306, the category of interest 308, the entry provider 206, the brand information 312, the normalization rule 212, or a combination thereof.

For a specific example, the branding rule 422 can factor the entry name 304, the category of interest 308, or a combination thereof to identify the brand information 312. More specifically, the branding rule 422 can establish the process to cross-reference the entry name 304, the location information 306, the category of interest 308, the entry provider 206, the brand information 312, or a combination thereof to the map data, the Brand Code, SIC, or a combination thereof.

For example, the entry name 304 of the POI 204 can represent "BOA—El Camino branch." The branding module 1018 can generate the POI brand 512 based on the branding rule 422 by identifying the POI 204 has the brand information 312 of "Bank of America," using the acronym derivation 416, by deriving the acronym of "BOA" as "Bank of America." More specifically, the branding module 1018 can cross-reference the acronym to a list of the entry name 304 that can be represented as "BOA." Furthermore, the branding module 1018 can cross-reference the address information 314 for the POI 204 with the map data discussed above to determine that the address information 314 indicates that the POI 204 is the category of interest 308 of "Bank." As a result, the branding module 1018 can generate the POI brand 512 based on, as defined in the branding rule 422, to combine the entry name 304 derived and the category of interest 308 to determine that the POI brand 512 is "Bank of America." The branding module 1018 can send the POI brand 512 to the attribute generator module 1010.

The normalization module 1006 can include a contact module 1020. The contact module 1020 generates the POI contact information 510 of FIG. 5. For example, the contact module can generate the POI contact information 510 based on normalizing the entry attribute 302 representing the entry contact information 310.

For a specific example, the contact module 1020 can generate the POI contact information 510 based on the name normalization 402 representing the punctuation normalization 406. The entry contact information 310 can represent a telephone number of "999-999-9999." The contact module 1020 can generate the POI contact information 510 based on the punctuation normalization 406 to remove the hyphen from the entry contact information 310 to generate "9999999999." The contact module 1020 can send the POI contact information 510 to the attribute generator module 1010.

The normalization module 1006 can include the attribute generator module 1010, which can couple to the location module 1008, the geocoding module 1012, the category module 1014, the expansion module 1016, the branding module 1018, the contact module 1020, or a combination thereof. The attribute generator module 1010 generates the record attribute 502. For example, the attribute generator module 1010 can generate the record attribute 502 based on the POI location 506, the POI category 508, the POI name 504, the POI brand 512, the POI contact information 510, or a combination thereof.

For a specific example, the attribute generator module 1010 can generate the record attribute 502 by selecting the entry attribute 302 normalized. More specifically, the entry name 304 can be normalized as the POI name 504 as discussed above. The attribute generator module 1010 can generate the record attribute 502 to include the POI name 504 for the POI record 216. The attribute generator module 1010 can send the record attribute 502 to a record generator module 1022.

The preprocessing module 1002 can include the record generator module 1022, which can couple to the normalization module 1006. The record generator module 1022 generates the POI record 216. For example, the record generator module 1022 can generate the POI record 216 based on converting the entry record 202 according to the POI schema 514.

The record generator module 1022 can generate the POI record 216 in a number of ways. For example, the record generator module 1022 can generate the POI record 216 based on the hierarchy of the data structure established in the POI schema 514. More specifically, the hierarchy of the data structure can differ between one instance of the entry record 202 to another instance of the entry record 202. The record generator module 1022 can convert the data structure of the entry record 202 based on the POI schema 514 to generate the POI record 216 having a consistent format of hierarchy for the data structure. The record generator module 1022 can generate the POI record 216 based on the POI schema 514 by, for example, deleting unneeded field, splitting or concatenating fields, formatting the field, deriving a missing field by extrapolating from the POI schema 514, or a combination thereof.

For a different example, the record generator module 1022 can generate the POI record 216 based on aggregating a plurality of the record attribute 502. More specifically, the record generator module 1022 can aggregate the plurality of the record attribute 502 representing the POI location 506, the POI category 508, the POI name 504, the POI brand 512, the POI contact information 510, or a combination thereof in accordance to the POI schema 514. For a specific example, the POI schema 514 can have the POI name 504 as the top instance of the record attribute 502 in the hierarchy followed by the POI category 508. The record generator module 1022 can generate the POI record 216 by aggregating the plurality of the record attribute 502 in the hierarchical order established by the POI schema 514 with, for example, the POI name 504 above the POI category 508. The record generator module 1022 can send the POI record 216 to a geography module 1024.

The navigation system 100 can include the geography module 1024, which can couple to the preprocessing module 1002. The geography module 1024 generates the record set 604 of FIG. 6. For example, the geography module 1024 can generate the record set 604 based on partitioning a plurality of the POI record 216.

The geography module 1024 can generate the record set 604 in a number of ways. The geography module 1024 can include a distance module 1026. The distance module 1026 calculates the distance score 616 of FIG. 6. For example, the distance module 1026 can calculate the distance score 616 between the plurality of the POI record 216 based on the population density 612 of FIG. 6, the POI category 508, or a combination thereof. Moreover, the distance module 1026 can calculate the distance score 616 for normalizing the POI inter-distance 610. As discussed above, the distance score 616 can range from the value of 0 to 1.

The distance module 1026 can calculate the distance score 616 in a number of ways. For example, the distance module 1026 can calculate the distance score 616 based on the population density 612. More specifically, if the population density 612 is high, the distance module 1026 can calculate the distance score 616 closer to 1 to indicate that the plurality of the POI 204 can be close in the POI inter-distance 610 of FIG. 6. In contrast, if the population density 612 is low, the distance module 1026 can calculate the distance score 616 to be closer to 0 to indicate that the plurality of the POI 204 can be far in the POI inter-distance 610.

For further example, the distance module 1026 can calculate the distance score 616 based on the POI category 508 relative to the population density 612. For example, the POI category 508 can represent "Coffee Shop." Even if the population density 612 is high, if the POI inter-distance 610 between the two instances of the POI record 216 representing a coffee shop exceeds the distance threshold 618 of FIG. 6, the distance module 1026 can calculate the distance score 616 with the value closer to 0 to indicate the POI inter-distance 610 between the two instances of the POI 204 is far.

In contrast, the POI category 508 can represent "National Park." Even if the population density 612 is low, if the POI inter-distance 610 between the two instances of the POI record 216 representing a national park is below the distance threshold 618, the distance module 1026 can calculate the distance score 616 with value closer to 1 to indicate the close in the POI inter-distance 610 between the two instances of the POI 204. The distance module 1026 can send the distance score 616 to a similarity module 1028.

The geography module 1024 can include a grid generator module 1030. The grid generator module 1030 generates the latitude-longitude grid 606 of FIG. 6. For example, the grid generator module 1030 can generate the latitude-longitude grid 606 based on the population density 612.

The grid generator module 1030 can generate the latitude-longitude grid 606 in a number of ways. For example, the grid generator module 1030 can generate the latitude-longitude grid 606 based on the population density 612 exceeding the density threshold 614 of FIG. 6. The grid generator module 1030 can generate the latitude-longitude grid 606 recursively to further divide the latitude-longitude grid 606 until the population density 612 within the latitude-longitude grid 606 further divided is below the density threshold 614. The grid generator module 1030 can send the latitude-longitude grid 606 to a partitioning module 1032.

The geography module 1024 can include the partitioning module 1032, which can couple to the grid generator module 1030. The partitioning module 1032 generates the record set 604. For example, the partitioning module 1032 can generate the record set 604 based on partitioning the plurality of the POI record 216.

The partitioning module 1032 can generate the record set 604 in a number of ways. For example, the partitioning module 1032 can generate the record set 604 based on partitioning the POI record 216 according to the partition key 602 of FIG. 6. For a specific example, the partition key 602 can represent the latitude-longitude grid 606. The partitioning module 1032 can generate the record set 604 by segregating one instance of the POI record 216 from another instance of the POI record 216 according to the geographical boundary established by the latitude-longitude grid 606. More specifically, the partitioning module 1032 can generate the record set 604 based on grouping the POI record 216 that fall within the same instance of the latitude-longitude grid 606.

For another example, the partitioning module 1032 can generate the record set 604 based on partitioning the POI record 216 according to the partition key 602 representing the road network 608 of FIG. 6. A plurality of the POI record 216 can have the POI location 506 on the same instance of the road network 608. The partitioning module 1032 can generate the record set 604 based on grouping the POI record 216 having the POI location 506 on the same instance of the road network 608. The partitioning module 1032 can generate the record set 604 based on the latitude-longitude grid 606, the road network 608, or a combination thereof. The partitioning module 1032 can send the record set 604 to the similarity module 1028.

It has been discovered that the navigation system 100 can generate the record set 604 based on the partition key 602 to reduce the computational burden for comparing the instances of the POI record 216. By partitioning the instances of the POI record 216 according to the partition key 602, such as the latitude-longitude grid 606, the road network 608, or a combination thereof, the navigation system 100 can reduce the number of instances the POI record 216 required to compare. As a result, the navigation system 100 can allocate the processing power for other needs, thus, improving the performance of the first device 102 for the safer operation of the navigation system 100, the first device 102, or a combination thereof.

The navigation system 100 can include the similarity module 1028, which can couple to the geography module 1024. The similarity module 1028 calculates the similarity score 702. For example, the similarity module 1028 can calculate the similarity score 702 based on comparing the plurality of the POI record 216. The plurality of the POI record 216 can represent a pair formed from two instances of the POI record 216. The similarity score 702 of 0 can represent a non-match while the similarity score 702 of 1 can represent an exact match. Moreover, the similarity module 1028 can calculate the similarity score 702 for each instances of the record attribute 502.

The similarity module 1028 can calculate the similarity score 702 in a number of ways. The similarity module 1028 can include an attribute level module 1034. The attribute level module 1034 calculates the attribute score 706 of FIG. 7. For example, the attribute level module 1034 can calculate the attribute score 706 based on comparing a plurality of the record attribute 502 for each instances of the POI record 216. Moreover, the attribute level module 1034 can calculate the attribute score 706 for each instances of the record attribute 502.

The attribute level module 1034 can calculate the attribute score 706 in a number of ways. For example, the attribute level module 1034 can calculate the attribute score 706 based on comparing a plurality of the POI name 504 using a string similarity comparison technique. For a specific example, the attribute level module 1034 can calculate the attribute score 706 based on the string similarity comparison technique representing the Jaro-Winkler distance. The Jaro-Winkler string-matching algorithm can measure the edit distance between two stings. The edit distance can represent the number of edits required for the two strings to be equivalent. Furthermore, the Jaro-Winkler string-matching algorithm can place more importance on the commonality of the string prefixes.

For example, the record attribute 502 can represent the POI name 504. The attribute level module 1034 can calculate the attribute score 706 based on comparing a plurality of the POI name 504 for each instances of the POI record 216. If the instances of the POI name 504 compared are an exact match, the attribute level module 1034 can calculate the attribute score 706 of 1. In contrast, if the instances of the POI name 504 compared has no similarity, the attribute level module 1034 can calculate the attribute score 706 of 0. The attribute level module 1034 can calculate the attribute score 706 between 0 and 1.

For a different example, the attribute level module 1034 can calculate the attribute score 706 based on the string similarity comparison technique representing the term frequency-inverse document frequency (TF-IDF). TF-IDF string comparison algorithm can determine a numerical statistic that reflects how important a word is to a document based on how many times it appears in the document. The attribute level module 1034 can calculate the attribute score 706 based on the TF-IDF string comparison algorithm with the value closer to 0 the more frequent the string appears in the corpus of the record attribute 502. In contrast, the attribute level module 1034 can calculate the attribute score 706 based on the TF-IDF string comparison algorithm with the value closer to 1 the less frequent the string appears in the corpus of the record attribute 502.

For example, the POI name 504 can represent "Tea Station Restaurant." A substring of the POI name 504, such as "restaurant" or "shop," can be calculated with the attribute score 706 with a value closer to 0 because the string can be commonly used or frequently appear in the POI name 504. In contrast, a substring of the POI name 504, such as "Tea Station," can be calculated with the attribute score 706 with a value closer to 1 because the string can be uncommon or infrequently appear in the POI name 504.

For a different example, the attribute level module 1034 can calculate the attribute score 706 based on the string similarity comparison technique representing the QGram. QGram string similarity technique can be used to compare the substring to determine the relative commonality of substrings within a pair of input strings. The more common the substring is, the attribute level module 1034 can calculate the attribute score 706 with the value closer to 1. In contrast, the less common the substring is, the attribute level module 1034 can calculate the attribute score 706 with the value closer to 0.

For example, the pair of input strings can represent the instance of the POI name 504 representing "Apple Restaurant" and another instance of the POI name 504 "Applebee's." The attribute level module 1034 can compare the substring of "Apple" between the two instances of the POI name 504 to calculate the attribute score 706. More specifically, the more letters shared by the substrings compared, the attribute level module 1034 can calculate the attribute score 706 with the value closer to 1.

The attribute level module 1034 can calculate the attribute score 706 based on comparing a plurality of the POI location 506 using the string similarity comparison technique. As discussed above, the POI location 506 can be represented in the structure of Door Number; Street Name; Street Type; City; State; and ZIP. The attribute level module 1034 can calculate the attribute score 706 for each component of the POI location 506 by comparing each components of one instance of the POI location 506 to each components of another instance of the POI location 506.

For example, the attribute level module 1034 can calculate the attribute score 706 based on comparing the strings representing the Door Number using the Jaro-Winkler distance. The attribute level module 1034 can calculate the attribute score 706 based on comparing the strings representing the Street Name using the Jaro-Winkler distance. The attribute level module 1034 can calculate the attribute score 706 as 1 or 0, a match or non-match, based on comparing strings representing Street Type. The attribute level module 1034 can calculate the attribute score 706 as 1 or 0, a match or non-match, based on comparing strings representing Street Direction.

The attribute level module 1034 can calculate the attribute score 706 based on comparing a plurality of the POI contact information 510 using the string similarity comparison technique. More specifically, the attribute level module 1034 can calculate the attribute score 706 based on comparing the strings representing the POI contact information 510 using the Jaro-Winkler distance.

The attribute level module 1034 can calculate the attribute score 706 based on the distance score 616. For example, if the distance score 616 is 1, the attribute level module 1034 can calculate the attribute score 706 as 1. In contrast, if the distance score 616 is 0, the attribute level module 1034 can calculate the attribute score 706 as 0.

The attribute level module 1034 can calculate the attribute score 706 based comparing a plurality of the POI category 508. For example, the attribute level module 1034 can calculate the attribute score 706 by comparing the category hierarchy 712 of FIG. 7 of the POI category 508. More specifically, the comparison of the category hierarchy 712 can base on the analysis of least common ancestor.

For a specific example, the POI category 508 of Korean food can have the following instance of the category hierarchy 712: Food→Restaurant→Asian→Korean food. The POI category 508 of Japanese food can have the following instance of the category hierarchy 712: Food→Restaurant→Asian→Japanese food. The two instances of the POI category 508 can share the category hierarchy 712 of "Food→Restaurant→Asian." The more similar the structure of the category hierarchy 712 is, the higher the value of the attribute score 706 that the attribute level module 1034 can calculate. For another example, the attribute level module 1034 can calculate the attribute score 706 of 1 if the instances of the POI category 508 compared are an exact match.

The attribute level module 1034 can calculate the attribute score 706 based comparing a plurality of the POI brand 512. For example, the attribute level module 1034 can calculate the attribute score 706 of 1 if the two instances of the POI brand 512 are an exact match. In contrast, the attribute level module 1034 can calculate the attribute score 706 of 0 if the two instances of the POI brand 512 are a non-match. The attribute level module 1034 can send the attribute score 706 to an overall module 1036.

The similarity module 1028 can include the overall module 1036, which can couple to the attribute level module 1034. The overall module 1036 calculates the overall score 708 of FIG. 7. For example, the overall module 1036 can calculate the overall score 708 based on the scoring rule 704 of FIG. 7. Moreover, the overall module 1036 can calculate the overall score 708 for the similarity between one instance of the POI record 216 and another instance of the POI record 216. The overall score 708 can range between 0 and 1 with the value assigned based on the scoring rule 704.

The overall module 1036 can calculate the overall score 708 in a number of ways. For example, the overall module 1036 can calculate the overall score 708 based on the scoring rule 704 representing the attribute score 706 meeting or exceeding the scoring threshold 808. For a specific example, the scoring threshold 808 can represent 0.1. The attribute score 706 calculated based on Qgram for the POI name 504 or the POI location 506 representing the Street Name can have the value of 0.09. If the attribute score 706 is less than the scoring threshold 808, the overall module 1036 can calculate the overall score 708 between the instances of the POI record 216 compared to be the value of 0. In contrast, if the attribute score 706 meets or greater than the scoring threshold 808, the overall module 1036 can calculate the overall score 708 between the instances of the POI record 216 compared to be the value of 1.

For a different example, the overall module 1036 can calculate the overall score 708 based on the scoring rule 704 representing the brand rule 810 of FIG. 8. Based on the brand rule 810, the overall module 1036 can calculate the overall score 708 between the instances of the POI record 216 to be 1 if each instances of the attribute score 706 compared for the POI brand 512, the POI location 506 representing the Street Name, and the POI location 506 representing the ZIP code have the values of 1. If not, the overall module 1036 can calculate the overall score 708 of 0 between the instances of the POI record 216 compared.

For a different example, the overall module 1036 can calculate the overall score 708 based on the scoring rule 704 representing the gas station rule 812 of FIG. 8. The POI category 508 can represent a gas station. Based on the gas station rule 812, the overall module 1036 can calculate the overall score 708 between the instances of the POI record 216 representing a gas station to be 1 if each instances of the attribute score 706 compared for the POI brand 512, the POI location 506 representing the Street Name, and the POI location 506 representing the ZIP code have the values of 1. If not, the overall module 1036 can calculate the overall score 708 of 0 between the instances of the POI record 216 compared.

For a different example, the overall module 1036 can calculate the overall score 708 based on the scoring rule 704 representing the grocery rule 814 of FIG. 8. The POI category 508 can represent a grocery store. Based on the grocery rule 814, the overall module 1036 can calculate the overall score 708 between the instances of the POI record 216 representing a grocery store to be 1 if each instances of the attribute score 706 compared for the POI brand 512, the POI location 506 representing the Street Name, and the POI location 506 representing the ZIP code have the values of 1. If not, the overall module 1036 can calculate the overall score 708 of 0 between the instances of the POI record 216 compared.

For a different example, the overall module 1036 can calculate the overall score 708 based on the scoring rule 704 representing the hotel rule 816 of FIG. 8. The POI category 508 can represent a hotel. Based on the hotel rule 816, the overall module 1036 can calculate the overall score 708 between the instances of the POI record 216 representing a hotel to be 1 if each instances of the attribute score 706 compared for the POI brand 512, the POI location 506 representing the Street Name, and the POI location 506 representing the ZIP code have the values of 1. If not, the overall module 1036 can calculate the overall score 708 of 0 between the instances of the POI record 216 compared.

For a different example, the overall module 1036 can calculate the overall score 708 based on the scoring rule 704 representing the direction rule 818 of FIG. 8. Based on the direction rule 818, the overall module 1036 can calculate the overall score 708 between the instances of the POI record 216 to be 1 if the following conditions are met. For example, the instances of the POI name 504 that were compared can have the attribute score 706 that meets or is greater than the scoring threshold 808, for example, of 0.79. The scoring threshold 808 can be configurable to tune the calculation of the overall score 708. For further example, the instances of the POI location 506 representing the Door Number, the Street Name, the Street Type, the ZIP code, or a combination thereof compared can have each instances of the attribute score 706 to be 1. If the above mentioned conditions are met, the overall module 1036 can calculate the overall score 708 of 1 between the instances of the POI record 216 compared.

For a different example, the overall module 1036 can calculate the overall score 708 based on the scoring rule 704 representing the landmark rule 820 of FIG. 8. Based on the landmark rule 820, the overall module 1036 can calculate the overall score 708 between the instances of the POI record 216 to be 1 if the following conditions are met. For example, the attribute score 706 for the instances of the POI category 508 compared can represent a value of 1. The POI category 508 can represent a landmark. And the attribute score 706 for the instances of the POI name 504 compared can meet or is greater than the scoring threshold 808 of 0.79. Furthermore, the POI inter-distance 610 between the instances of the POI record 216 compared can be less than the distance threshold 618, such as 1000 meters. If the above mentioned conditions are met, the overall module 1036 can calculate the overall score 708 of 1 between the instances of the POI record 216 compared.

For a different example, the overall module 1036 can calculate the overall score 708 based on the scoring rule 704 representing the contact information rule 822 of FIG. 8. Based on the contact information rule 822, the overall module 1036 can calculate the overall score 708 between the instances of the POI record 216 to be 1 if the following conditions are met. For example, the attribute score 706 for the instances of the POI name 504 compared can represent a value of 1. And the attribute score 706 for the instances of the POI contact information 510 compared can represent a value of 1. Furthermore, the POI inter-distance 610 between the instances of the POI record 216 compared can be less than the distance threshold 618, such as 100 meters. If the above mentioned conditions are met, the overall module 1036 can calculate the overall score 708 of 1 between the instances of the POI record 216 compared.

The overall module 1036 can calculate the overall score 708 based on combining the various instances of the scoring rule 704. For example, the overall module 1036 can calculate the overall score 708 based on combining the scoring rule 704 representing the direction rule 818 and the landmark rule 820. The overall module 1036 can calculate the overall score 708 of 1 if the calculation of the overall score 708 based on one of the scoring rule 704 can result in the value of 1. For a different example, the overall module 1036 can calculate the overall score 708 of 0 if the calculation of the overall score 708 based on one of the scoring rule 704 can result in the value of 0.

The overall module 1036 can calculate the overall score 708 based on executing the machine learning algorithm, such as the Support Vector Machine (SVM). More specifically, the overall module 1036 can extrapolate the overall score 708 based on the attribute score 706, the overall score 708, or a combination thereof calculated previously for comparing instances of the POI record 216. Further, the overall module 1036 can calculate the overall score 708 based on executing the machine learning algorithm if the overall score 708 cannot be calculated based on the scoring rule 704. In other words, the overall module 1036 can prioritize the calculated of the overall score 708 based on the scoring rule 704 over the calculation of the overall score 708 based on executing the machine learning algorithm. The overall module 1036 can send the overall score 708 to a clustering module 1038.

The navigation system 100 can include the clustering module 1038, which can couple to the similarity module 1028. The clustering module 1038 generates the affinity group 218 of FIG. 2. For example, the clustering module 1038 can generate the affinity group 218 based on aggregating a plurality of the POI record 216.

The clustering module 1038 can generate the affinity group 218 in a number of ways. The clustering module 1038 can include a group generator module 1040. The group generator module 1040 generates the affinity group 218. For example, the group generator module 1040 can generate the affinity group 218 based on connecting a plurality of the record node 802 of FIG. 8 with the record edge 804 of FIG. 8. More specifically, the group generator module 1040 can generate the affinity group 218 based on executing the clustering algorithms, such as the Graph Coloring algorithm, the Markov Chain Clustering algorithm, or a combination thereof.

Graph Coloring algorithm can convert the graph from a weighted graph to a non-weighted graph. Initially, the edge weight threshold 806 of FIG. 8 can be declared. The record edge 804 less than the edge weight threshold 806 can be dropped. The granularity of the graph can be controlled by adjusting the value of the edge weight threshold 806, such as 0.8. The resultant graph can be inverted so that instances of the edge weight threshold 806 in the graph produced should be deleted and any non-connected instances of the record node 802 in the same graph should be connected with the record edge 804. The granularity of the resulting clusters for utilizing the Markov Chain Clustering algorithm can be adjusted by tuning the inflation parameter.

As discussed above, the record node 802 can represent the POI record 216. And the record edge 804 can have a weight value represented by the overall score 708. The group generator module 1040 can generate the affinity group 218 based on connecting one instance of the record node 802 to another instance of the record node 802 with the record edge 804 if the overall score 708 is greater than 0. The group generator module 1040 can send the affinity group 218 to a group refiner module 1042.

The clustering module 1038 can include the group refiner module 1042, which can couple to the group generator module 1040. The group refiner module 1042 refines the affinity group 218. For example, the group refiner module 1042 can refine the affinity group 218 based on removing the record edge 804 to sever the connection between the instances of the record node 802.

The group refiner module 1042 can refine the affinity group 218 in a number of ways. For example, the group refiner module 1042 can refine the affinity group 218 based on removing the record edge 804 that fail to meet the edge weight threshold 806 of FIG. 8. The edge weight threshold 806 can represent 0.8. If the record edge 804 between one instance of the record node 802 and another instance of the record node 802 can have the overall score 708 of less than the edge weight threshold 806, the similarity relationship between the instances of the record node 802 can be low, thus, severable.

The group refiner module 1042 can refine the affinity group 218 by removing the record edge 804 that fail to meet the edge weight threshold 806 to sever the connection between the instances of the record node 802. Moreover, the group refiner module 1042 can generate the affinity group 218 by filtering out the record node 802 with the connection of the record edge 804 below the edge weight threshold 806.

As a result, the group refiner module 1042 can refine the affinity group 218 by reducing the number of the record node 802 in the affinity group 218 to improve the similarity relationship between the instances of the record node 802 that remain in the affinity group 218. More specifically, the similarity relationship can represent the high level of corroboration amongst the instances of the POI record 216. The POI record 216 that remained in the affinity group 218 is a supporting fact that the instances of the POI record 216 is a representation of the POI 204 in the real world. The edge weight threshold 806 can be adjusted to control the removal process of the record edge 804. The group refiner module 1042 can send the affinity group 218 to a synthesis module 1044.

It has been discovered that the navigation system 100 can generate the affinity group 218 to improve the accuracy of the POI record 216 representing the POI 204. By generating the affinity group 218, the navigation system 100 can only keep the POI record 216 that was highly corroborated by other instances of the POI record 216. As a result, the navigation system 100 can improve the accuracy of generating the exemplary POI 220 of FIG. 2 to represent the POI 204 for safer operation of the navigation system 100, the first device 102, or a combination thereof.

The navigation system 100 can include the synthesis module 1044, which can couple to the clustering module 1038. The synthesis module 1044 generates the exemplary POI 220. For example, the synthesis module 1044 can generate the exemplary POI 220 based on the affinity group 218.

The synthesis module 1044 can generate the exemplary POI 220 in a number of ways. For example, the synthesis module 1044 can generate the exemplary POI 220 based on selecting the POI record 216 from the affinity group 218. More specifically, the synthesis module 1044 can select the POI record 216 based on the record attribute 502. Moreover, the record attribute 502 considered can represent the entry provider 206. The synthesis module 1044 can select the POI record 216 generated based from the entry record 202 provided by the entry provider 206 having the highest instance of the priority rank 224 of FIG. 2 amongst a plurality of the entry provider 206.

For another example, the synthesis module 1044 can generate the exemplary POI 220 based on selecting the POI record 216 having the highest value of the attribute frequency 710 of FIG. 7 of the record attribute 502 within the affinity group 218. For example, the record attribute 502 can represent the POI name 504. The attribute frequency 710 for the POI name 504 such as "Starbucks Coffee" can be higher than the attribute frequency 710 for the POI name 504 such as "Starbucks" in the affinity group 218. The synthesis module 1044 can generate the exemplary POI 220 by selecting the POI record 216 with the POI name 504 of "Starbucks Coffee" based on the highest value of the attribute frequency 710 within the affinity group 218.

It has been discovered that the navigation system 100 can generate the exemplary POI 220 accurately representing the POI 204 in the real world. By generating the exemplary POI 220, advertisement information related to POI 204 can correctly associate the exemplary POI with the intended instance of the POI 204. As a result, the efficiency for target advertisement can improve by reducing the incorrect association between the exemplary POI 220 and the POI 204.

It has also been discovered that the navigation system 100 can generate the exemplary POI 220 to improve the searching capability for querying for the POI 204. By standardizing the representation of the POI 204 as the exemplary POI 220, the user of the first device 102 can expect a search return representative of the POI 204. As a result, the efficiency and accuracy of the search query can improve to enhance the safe operation of the navigation system 100, the first device 102, or a combination thereof.

The physical transformation from traveling along the road network 608 to move from one instance of the latitude-longitude grid 606 to another results in movement in the physical world, such as people using the first device 102, the vehicle, or a combination thereof, based on the operation of the navigation system 100. As the movement in the physical world occurs, the movement itself creates additional information that is converted back into the detection of the changes in the population density 612 for generation of the record set 604 for the continued operation of the navigation system 100 and to continue the movement in the physical world.

The first software 926 of FIG. 9 of the first device 102 of FIG. 9 can include the modules for the navigation system 100. For example, the first software 926 can include the preprocessing module 1002, the geography module 1024, the similarity module 1028, the clustering module 1038, and the synthesis module 1044.

The first control unit 912 of FIG. 9 can execute the first software 926 for the preprocessing module 1002 to generate the POI record 216. The first control unit 912 can execute the first software 926 for the geography module 1024 to generate the record set 604. The first control unit 912 can execute the first software 926 for similarity module 1028 to calculate the similarity score 702. The first control unit 912 can execute the first software 926 for the clustering module 1038 to generate the affinity group 218. The first control unit 912 can execute the first software 926 for the synthesis module 1044 to generate the exemplary POI 220.

The second software 942 of FIG. 9 of the second device 106 of FIG. 9 can include the modules for the navigation system 100. For example, the second software 942 can include the preprocessing module 1002, the geography module 1024, the similarity module 1028, the clustering module 1038, and the synthesis module 1044.

The second control unit 934 of FIG. 9 can execute the second software 942 for the preprocessing module 1002 to generate the POI record 216. The second control unit 934 can execute the second software 942 for the geography module 1024 to generate the record set 604. The second control unit 934 can execute the second software 942 for similarity module 1028 to calculate the similarity score 702. The second control unit 934 can execute the second software 942 for the clustering module 1038 to generate the affinity group 218. The second control unit 934 can execute the second software 942 for the synthesis module 1044 to generate the exemplary POI 220.

The modules of the navigation system 100 can be partitioned between the first software 926 and the second software 942. For example, the second software 942 can include the geography module 1024, the similarity module 1028, the clustering module 1038, and the synthesis module 1044. The second control unit 934 can execute modules partitioned on the second software 942 as previously described.

The first software 926 can include the preprocessing module 1002. Based on the size of the first storage unit 914 of FIG. 9, the first software 926 can include additional modules of the navigation system 100. The first control unit 912 can execute the modules partitioned on the first software 926 as previously described.

The first control unit 912 can operate the first communication unit 916 of FIG. 9 to send the POI record 216 to the second device 106. The first control unit 912 can operate the first software 926 to operate the location unit 920 of FIG. 9. The second communication unit 936 of FIG. 9 can send the exemplary POI 220 to the first device 102 through the communication path 104 of FIG. 9.

The navigation system 100 describes the module functions or order as an example. The modules can be partitioned differently. For example, the similarity module 1028 and the clustering module 1038 can be combined. Each of the modules can operate individually and independently of the other modules.

Furthermore, data generated in one module can be used by another module without being directly coupled to each other. For example, the similarity module 1028 can receive the POI record 216 from the preprocessing module 1002. The modules described in this application can be hardware implementation or hardware accelerators in the first control unit 912 or in the second control unit 934. The modules can also be hardware implementation or hardware accelerators within the first device 102 or the second device 106 but outside of the first control unit 912 or the second control unit 934, respectively.

Referring now to FIG. 5, therein is shown a flow chart of a method 1100 of operation of the navigation system 100 in a further embodiment of the present invention. The method 1100 includes: generating a point of interest (POI) record based on normalizing an entry record in a bloc 1102; calculating a similarity score based on comparing a plurality of the POI record to each other in a block 1104; and generating an affinity group with a control unit based on the similarity score meeting or exceeding an edge weight threshold for displaying on a device in a block 1106.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A method of operation of a navigation system comprising:
   generating a point of interest (POI) record based on normalizing an entry record;
   generating a latitude-longitude grid based on a population density below a density threshold;
   generating a record set including a plurality of the POI record based on a partition key including the latitude-longitude grid and a road network;
   calculating a similarity score based on comparing the plurality of the POI record, in the record set, to each other;
   generating an affinity group with a control unit based on connecting one instance of a record node representing the POI record to another instance of the record node with a record edge including the similarity score meeting or exceeding an edge weight threshold; and
   transmitting the affinity group for displaying on a device.

2. The method as claimed in claim 1 further comprising generating an exemplary POI based on selecting the POI record from the affinity group.

3. The method as claimed in claim 1 further comprising generating the record set by partitioning the plurality of the POI record based on the partition key.

4. The method as claimed in claim 1 further comprising generating a record attribute of the POI record based on normalizing an entry attribute of the entry record.

5. The method as claimed in claim 1 wherein generating the POI record includes generating the POI record based on a normalization rule for normalizing an entry attribute of the entry record.

6. A method of operation of a navigation system comprising:
   receiving an entry record having an entry attribute;
   generating a point of interest (POI) record based on normalizing the entry record;
   generating a latitude-longitude grid based on a population density below a density threshold;
   generating a record set including a plurality of the POI record based on a partition key including the latitude-longitude grid and road network;
   calculating a similarity score based on comparing the plurality of the POI record in the record set, to each other;
   generating an affinity group with a control unit based on connecting one instance of a record node representing the POI record to another instance of the record node with a record edge including the similarity score meeting or exceeding an edge weight threshold; and
   transmitting the affinity group for displaying on a device.

7. The method as claimed in claim 6 further comprising generating a record attribute of the POI record based on a name normalization for normalizing the entry attribute.

8. The method as claimed in claim 6 further comprising calculating a distance score between the plurality of the POI record for normalizing a POI inter-distance.

9. The method as claimed in claim 6 wherein generating the affinity group includes removing the record edge having the similarity score below the edge weight threshold.

10. A navigation system comprising:
    a control unit for:
      generating a point of interest (POI) record based on normalizing an entry record,
      generating a latitude-longitude grid based on a population density below a density threshold;
      generating a record set including a plurality of the POI record based on a partition key including the latitude-longitude grid and a road network,
      calculating a similarity score based on comparing the plurality of the POI record, in the record set, to each other,
      generating an affinity group based on connecting one instance of a record node representing the POI record to another instance of the record node with a record edge including the similarity score meeting or exceeding an edge weight threshold, and
    a communication unit, configured to the control unit, for transmitting the affinity group for displaying on a device.

11. The system as claimed in claim 10 wherein the control unit is for generating an exemplary POI based on selecting the POI record from the affinity group.

12. The system as claimed in claim 10 wherein the control unit is for generating the record set by partitioning the plurality of the POI record based on the partition key.

13. The system as claimed in claim 10 wherein the control unit is for generating a record attribute of the POI record based on normalizing an entry attribute of the entry record.

14. The system as claimed in claim 10 wherein the control unit is for generating the POI record based on a normalization rule for normalizing an entry attribute of the entry record.

15. The system as claimed in claim 10 wherein the control unit is for receiving an entry record having an entry attribute.

16. The system as claimed in claim 15 wherein the control unit is for generating a record attribute of the POI record based on a name normalization for normalizing the entry attribute.

17. The system as claimed in claim 15 wherein the control unit is for calculating a distance score between the plurality of the POI record for normalizing a POI inter-distance.

18. The system as claimed in claim 15 wherein the control unit is for removing the record edge having the similarity score below the edge weight threshold.

* * * * *